United States Patent
Kurobe et al.

(10) Patent No.: US 7,483,679 B2
(45) Date of Patent: Jan. 27, 2009

(54) PORTABLE-TERMINAL HOLDER AND RADIO COMMUNICATION SYSTEM

(75) Inventors: Takahiro Kurobe, Yokohama (JP); Yoshiki Nagai, Toyota (JP)

(73) Assignee: Denso Wave Incorporated, Tokyo (JP)

( * ) Notice: Subject to any disclaimer, the term of this patent is extended or adjusted under 35 U.S.C. 154(b) by 624 days.

(21) Appl. No.: 11/065,283

(22) Filed: Feb. 25, 2005

(65) Prior Publication Data
US 2005/0189423 A1 Sep. 1, 2005

(30) Foreign Application Priority Data
Feb. 27, 2004 (JP) ............... 2004-053788
Feb. 27, 2004 (JP) ............... 2004-053789

(51) Int. Cl.
*H04Q 7/20* (2006.01)
(52) U.S. Cl. ............... 455/90.3; 455/556.1; 455/554.2; 455/573; 455/575.6
(58) Field of Classification Search ............ 455/456.2, 455/557, 456.1, 457, 456.5, 569.1, 423, 456.3, 455/90.3, 74.1, 458, 569, 558, 552.1, 41.2, 455/418, 420, 90.1, 90.2, 66.1, 517, 573, 455/556.2; 235/462.45, 462.42, 472
See application file for complete search history.

(56) References Cited

U.S. PATENT DOCUMENTS

| | | | | |
|---|---|---|---|---|
| 5,756,984 A | * | 5/1998 | Kobayashi | ............ 235/462.45 |
| 6,216,951 B1 | * | 4/2001 | Swift et al. | ............ 235/462.45 |
| 6,438,229 B1 | * | 8/2002 | Overy et al. | ................ 379/446 |
| 7,221,961 B1 | * | 5/2007 | Fukumoto et al. | ........... 455/557 |
| 7,318,551 B1 | * | 1/2008 | Mills | ........................... 235/441 |
| 2002/0072390 A1 | * | 6/2002 | Uchiyama | .................... 455/557 |
| 2003/0008703 A1 | * | 1/2003 | Gauselmann | ................ 463/20 |
| 2003/0181168 A1 | * | 9/2003 | Herrod et al. | .............. 455/90.3 |
| 2005/0037709 A1 | * | 2/2005 | Hwang | ...................... 455/66.1 |
| 2008/0043676 A1 | * | 2/2008 | Mousseau et al. | ........... 370/331 |

FOREIGN PATENT DOCUMENTS

| | | |
|---|---|---|
| JP | A-H06-068353 | 3/1994 |
| JP | A-H09-181680 | 7/1997 |
| JP | A-2000-270239 | 9/2000 |
| JP | 2001-144767 | 5/2001 |
| JP | 2002-334299 | 11/2002 |
| JP | 2003-143156 | 5/2003 |

OTHER PUBLICATIONS

Office Action dated Aug. 28, 2007 in corresponding Japanese Patent Application No. 2004-053788 (and English translation).

* cited by examiner

*Primary Examiner*—Tan Trinh
(74) *Attorney, Agent, or Firm*—Posz Law Group, PLC

(57) ABSTRACT

A portable-terminal holder for holding a portable terminal that has a rechargeable battery and a first radio communication device is constituted by a base and c communication module. The base has a portion on which the portable terminal is placed, and a charging device for charging the rechargeable battery of the portable terminal while said portable terminal is placed on the portion. The communication module has a second radio communication device communicating with the first radio communication device for wireless data transmission between the portable terminal and the communication module, and a cable communication device communicating with an external host computer for cable data transmission between the host computer and the communication module. The communication module is configured to be detachable from the base.

12 Claims, 17 Drawing Sheets

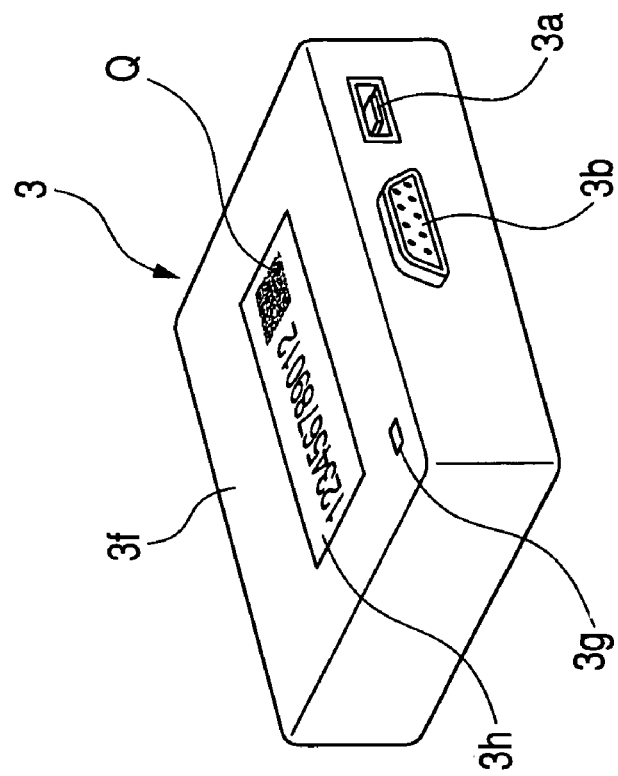
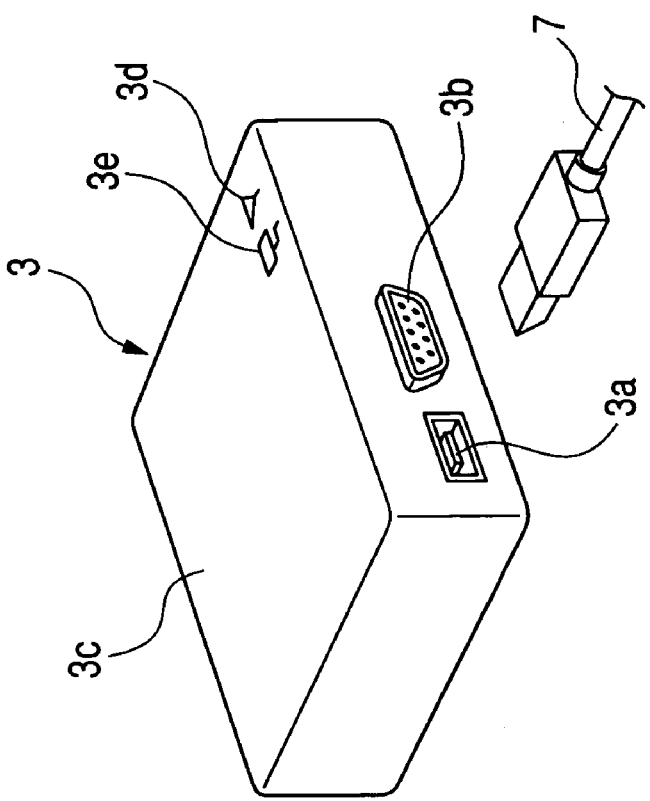

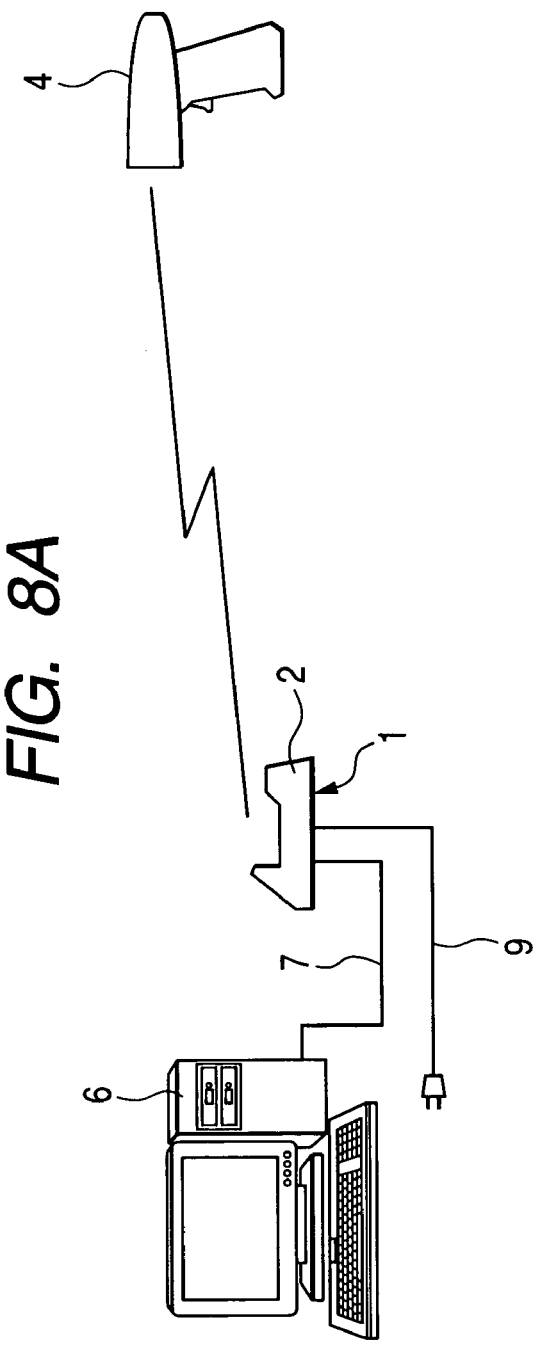

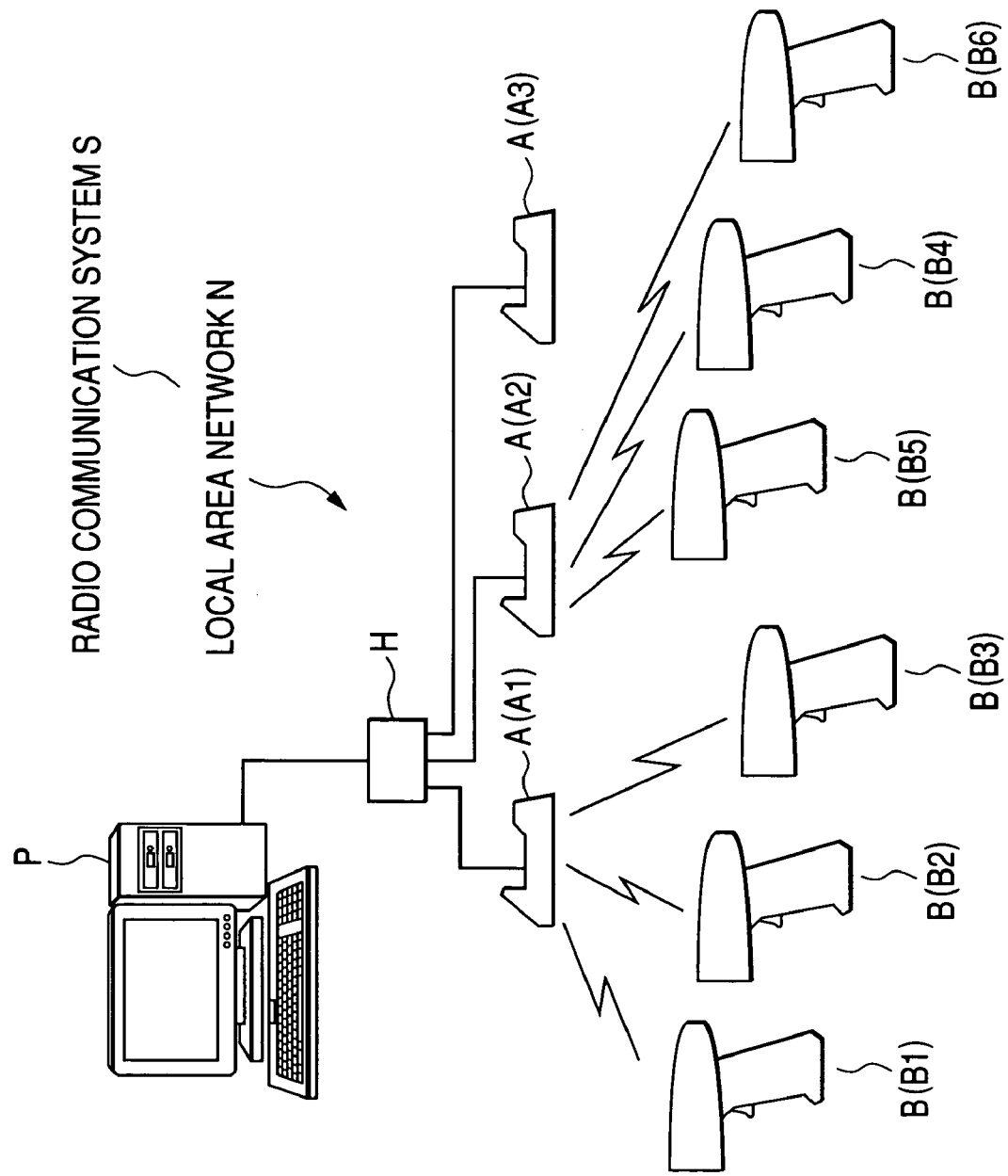

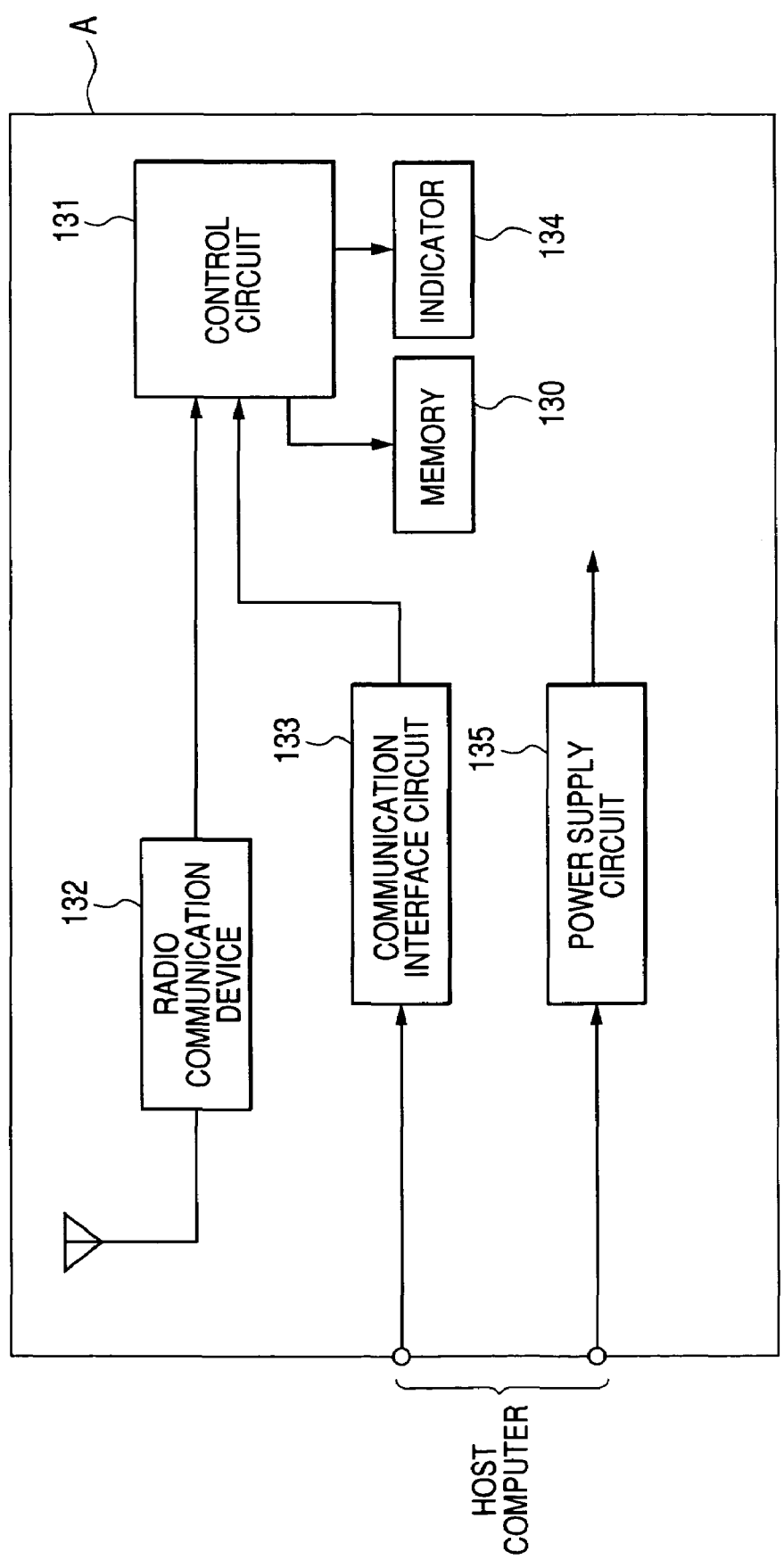

|     | LOCAL ID | RESULT OF ABSOLUTE VALIDATION |
|-----|----------|-------------------------------|
| (1) | DE1000000 | OK |
| (2) | BA1023456 | OK |
| (3) | DE000 | NG |
| (4) | 0000000DE | NG |
| (5) | ADAPTER00 | NG |

FIG. 18
| PRIORITY | ABSOLUTE ID | LOCAL ID |
|---|---|---|
| 1 | AAAXYY | — |
| 2 | BBBXYY | — |
| 3 | — | DEN002 |
| ⋮ | ⋮ | ⋮ |
FIG. 19A
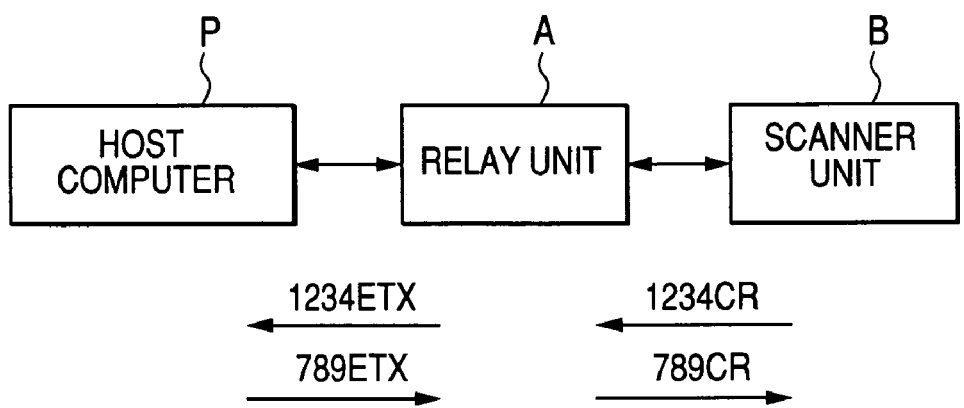
FIG. 19B
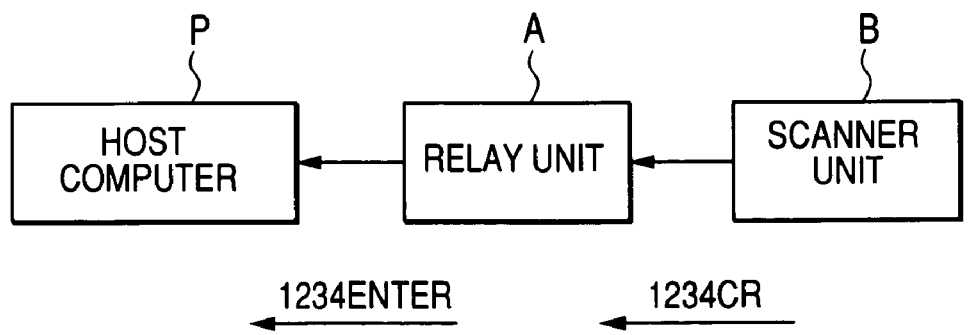

PORTABLE-TERMINAL HOLDER AND RADIO COMMUNICATION SYSTEM

CROSS-REFERENCE TO RELATED APPLICATION

This application is related to Japanese Patent Applications No. 2004-53788 filed on Feb. 27, 2004, and No. 2004-53789 filed on Feb. 27, 2004, the contents of which are hereby incorporated by reference.

BACKGROUND OF THE INVENTION

1. Field of the Invention

The present invention relates to a portable-terminal holder being able to charge a portable terminal and relay data between the portable terminal and a host computer.

The present invention also relates to a radio communication system including a plurality of radio communication terminals each of which has an absolute ID and a capability of performing radio communication with other radio communication terminals in conformity with a specific radio communication standard.

2. Description of Related Art

Japanese Patent Application Laid-open No. 2002-334299 discloses that a rechargeable battery of a scanner unit functioning as a portable terminal is charged when the scanner unit is placed on a holder, and accordingly charging terminals of the scanner unit are in contact with charging terminals of the holder. The scanner unit and the holder connectable by a cable to a POS register serving as a host computer are configured to perform wireless communication between each other, thereby enabling data transmission between the scanner unit and the POS register.

A user can use such a scanner unit for reading information codes such as bar codes or QR codes in a workplace as far as 10 m away from the host computer thanks to the wireless communication between the scanner unit and the holder.

However, in a case where the user uses the scanner unit for many hours, it frequently occurs that the battery of the scanner unit becomes exhausted, and needs to be recharged. If the workplace is distant from the host computer, the user has to bring the scanner unit to the holder placed in a location distant from the workplace, because the length of the cable connecting the holder and the host computer is generally limited to 1 m-3 m. This lowers the working efficiency, especially when the user uses only one scanner unit. This problem arises also in holders for cellular phones or PDAs.

Generally, in a radio communication system including a plurality of radio terminals, each of the radio communication terminals is provided with an absolute ID in order to avoid radio communication between irrelevant radio communication terminals and to improve network communication speed.

Since all the radio communication terminals have to be assigned the absolute ID uniquely throughout an area over which the same radio communication standard is applied, the absolute ID is described by a very long code which is hard for users of the radio communication terminals to recognize. In a case where radio communication terminals conforming to the Bluetooth standard constitute a network, Bluetooth addresses are used as the absolute IDs for performing a connection authentication. The radio communication terminals can recognize each other by performing the connection authentication generally called "paring" that uses the Bluetooth addresses each of which is described as a long code having a 48-bit length.

As disclosed in Japanese Patent Application Laid-open No. 2001-144767, the connection between two radio communication terminals may be established by a handshake in which a calling terminal receives an address of a called terminal through a communication network to sign up to the communication network. Japanese Patent Application Laid-open No. 2001-144767 also discloses that information items about radio communication terminals that have been detected to be within a certain communication range, for example, their device names are displayed on a display of a calling radio communication terminal, so that the user can easily select, from among the detected radio communication terminals, an intended party. Japanese Patent Application Laid-open No. 2003-143156 discloses that communication terminals are grouped depending on their communication-group IDs to facilitate the settings of the communication terminals.

For performing a connection authentication in a radio communication network in conformity with the Bluetooth standard, the user has to set a Bluetooth address of a target communication terminal in a calling communication terminal.

However, it is very troublesome for the user to handle the 48-bit Bluetooth addresses, especially in a radio communication system constituted by a host computer not provided with a display device such as an LCD, and peripheral devices (input-output device, data storage, and the like) connected to the host computer through a radio communication network, because the above described technique disclosed in Japanese Patent Application Laid-open No. 2001-144767 cannot be used in such a radio communication system. Moreover, even if the host computer is provided with a function of displaying detected communication terminals on its display device to enable selecting, from among them, a communication target, it is not easy for the user to remember their absolute IDs.

SUMMARY OF THE INVENTION

The portable-terminal holder of the invention for holding a portable terminal having a rechargeable battery and a first radio communication device includes:

a base having a portion on which the portable terminal is placed, and a charging device charging the rechargeable battery while the portable terminal is placed on the portion; and a communication module having a second radio communication device communicating with the first radio communication device for wireless data transmission between the portable terminal and the communication module and a cable communication device communicating with an external host computer for cable data transmission between the host computer and the communication module, the communication module being configured to be detachable from the base.

With this portable-terminal holder of the invention, a user of the portable terminal can charge the rechargeable battery at any time without going out of a workplace where the user uses the portable terminal even in a case where the workplace is distant from the host computer (5 to 10 m distant, for example), and a communication cable for connection between the host computer and the communication module has a length of 2 to 3 m, because the user can detach the communication module from the base and bring only the base to the workplace.

The portable-terminal holder may include a communication status indicator indicating at least one of a status of wireless data transmission by the first and second radio communication devices and a status of cable data transmission by the cable communication device.

The portable-terminal holder may have a window portion that makes the communication status indicator of the communication module attached in the base visible from outside. Preferably, the window portion is covered with a transparent plate for protection.

The base may include a power status indicator indicating at least a status of charging the rechargeable battery of the portable terminal by the charging device of the base. Preferably, the power status indicator is installed in such a position that it is adjacent to the communication status indicator of the communication module attached in the base, so that the user can recognize those indicators at once.

The communication module may include a plurality of connectors connected to the cable communication device for use of performing cable data transmission with outside and receiving an electric current as electric power of the communication module from outside. In this case, the communication module is preferably provided with a current back-flow preventing device preventing an electrical current flowing from one of the plurality of the connectors into the communication module from flowing back to the other of the plurality of the connectors.

The radio communication system of the invention has a structure including:

a first radio terminal assigned a first absolute ID; and a second radio terminal assigned a second absolute ID, the first and second radio terminals having capability of performing radio communication with each other using the first and second absolute IDs in conformity with a predetermined radio communication standard, wherein the first radio terminal has a memory device for storing a combination of the first absolute ID and a local ID for distinction of the first radio terminal within a local area network constituted by the first and second radio terminals, the second radio terminal has capability of transmitting a search signal for searching a target radio terminal, the first radio terminal is configured to transmit, upon receiving the search signal, a response signal containing the combination of the first absolute ID and the local ID, the second radio terminal is configured to validate, upon receiving the response signal from the first radio terminal, the local ID, and to transmit a communication establishment request signal for requesting communication with the first radio terminal as the target radio terminal if the local ID is determined to be valid.

With this structure, if the user assigns a local ID to the first radio terminal operating as a target terminal, it becomes possible for the user to save the trouble of setting an absolute ID of the first radio terminal in the second radio terminal operating as a calling terminal.

Another radio communication system of the invention has a structure including:

a first radio terminal assigned a first absolute ID; and a second radio terminal assigned a second absolute ID, the first and second radio terminals having capability of performing radio communication with each other using the first and second absolute IDs in conformity with a predetermined radio communication standard, wherein the first radio terminal has a memory device for storing a combination of the first absolute ID and a first local ID for distinction of the first radio terminal within a local area network constituted by the first and second radio terminals, the second radio terminal has a memory device for storing a combination of the second absolute ID and a second local ID for distinction of the second radio terminal within the local area network, the first and second radio terminals have capability of transmitting a search signal for searching a target radio terminal, the first radio terminal is configured to transmit, upon receiving the search signal, a response signal containing the combination of the first absolute ID and the first local ID, the second radio terminal is configured to transmit, upon receiving the search signal, a response signal containing the combination of the second absolute ID and the second local ID, the first radio terminal is configured to validate, upon receiving the response signal from the second radio terminal, the second local ID by comparing the second local ID with a local ID prestored in the memory device of the first radio terminal, and transmit a communication establishment request signal for requesting communication with the second radio terminal if the second local ID is determined to be valid the second radio terminal is configured to validate, upon receiving the response signal from the first radio terminal, the first local ID by comparing the first local ID with a local ID prestored in the memory device of the second radio terminal, and transmit a communication establishment request signal for requesting communication with the first radio terminal if the first local ID is determined to be valid.

With this structure, if the user assigns a local ID to each of the first and second radio terminals, it becomes possible for the user to save the trouble of setting the absolute 10 of the first or second radio terminal operating as a target terminal in the first or second radio terminal operating as a calling terminal.

Still another radio communication system of the invention has a structure including:

a first radio terminal having a first absolute ID; and a second radio terminal having a second absolute ID;

the first and second radio terminals having capability of performing radio communication with each other using the first and second absolute IDs in conformity with a predetermined radio communication standard, wherein the second radio terminal has a memory device for storing a combination of the second absolute ID and a second local ID for distinction of the second radio terminal within a local area network constituted by the first and second radio terminals, and an information item expressing the second local ID, the information item being displayed on the second radio terminal, the first radio terminal has capability of reading the information item displayed on the second radio terminal and capability of transmitting a search signal for searching a target radio terminal, the second radio terminal is configured to transmit, upon receiving the search signal, a response signal containing the combination of the second absolute ID and the second local ID, the first radio terminal is configured to validate, upon receiving the response signal from the second radio terminal, the second local ID, and to transmit a communication establishment request signal for requesting communication with the second radio terminal as the target radio terminal if the second local ID is determined to be valid by comparing the second local ID contained in the response signal transmitted from the second radio terminal with the information item displayed on the second radio terminal which is read by the first radio terminal and stored in the memory device of the first radio terminal.

BRIEF DESCRIPTION OF THE DRAWINGS

In the accompanying drawings;

FIG. 3A is a diagram showing a top side of the communication module;

FIG. 3B is a diagram showing a bottom side of the communication module;

FIG. 8A is a diagram for explaining operations of the terminal holder when the communication module is attached in the base;

FIG. 8B is a diagram for explaining operations of the terminal holder when the communication module is detached from the base;

FIG. 9 is a diagram showing a schematic structure of a radio communication system for reading information codes according to a second embodiment of the invention;

FIG. 11 is a diagram showing an electrical configuration of a relay unit included in the radio communication system according to the second embodiment;

FIG. 18 is a diagram showing an example of a priority order table contained in a memory device of a relay unit included in the radio communication system according to the fourth embodiment of the invention; and FIGS. 19A and 19B are diagrams for explaining character code conversion performed in a radio communication system according to a fifth embodiment of the invention.

PREFERRED EMBODIMENTS OF THE INVENTION

First Embodiment

Figure 1:
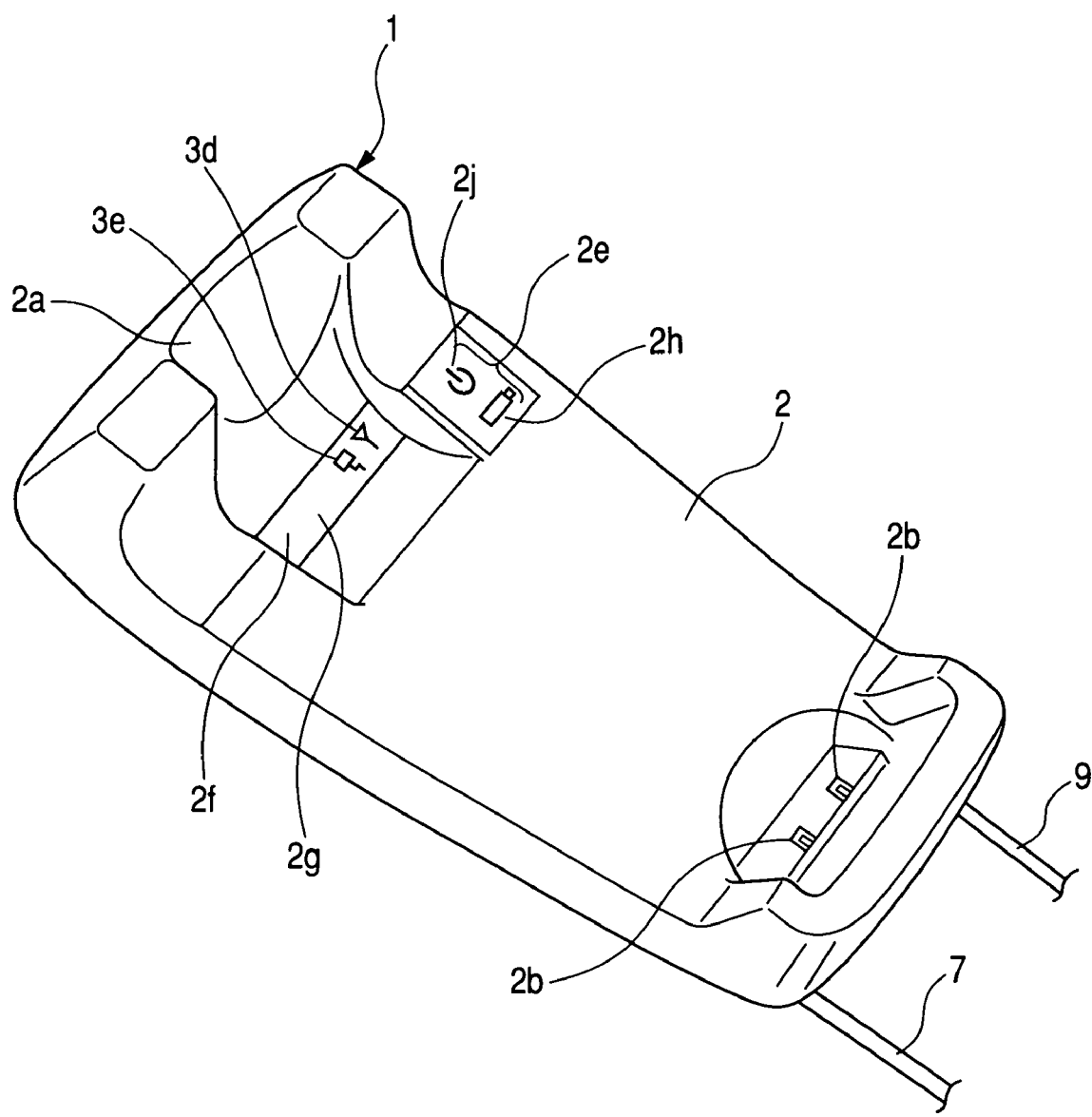
FIG. 1 is a diagram showing a portable-terminal holder according to a first embodiment of the invention when viewed from above.

A portable-terminal holder according to an embodiment of the invention has a base for receiving thereon a portable terminal and a communication module. FIG. 1 is a diagram showing the portable-terminal holder 1 (referred to as simply holder 1 hereinafter) fitted with the communication module 3 when viewed from above. FIG. 2A is a diagram showing the holder 1 separated from the communication module 3 when viewed from above, and FIG. 2B is a diagram showing the holder 1 separated from the communication module 3 when viewed from below.

Figure 2B:
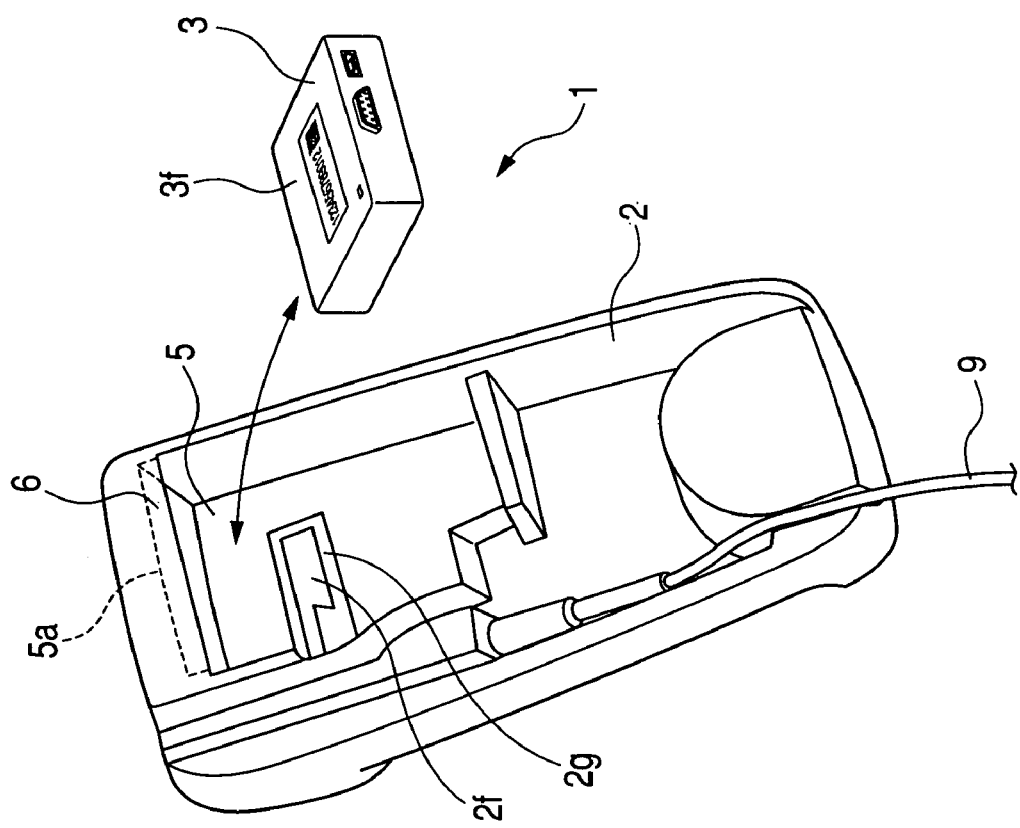
FIG. 2B is a diagram showing the terminal holder separated from the communication module when viewed from below
Figure 2A:
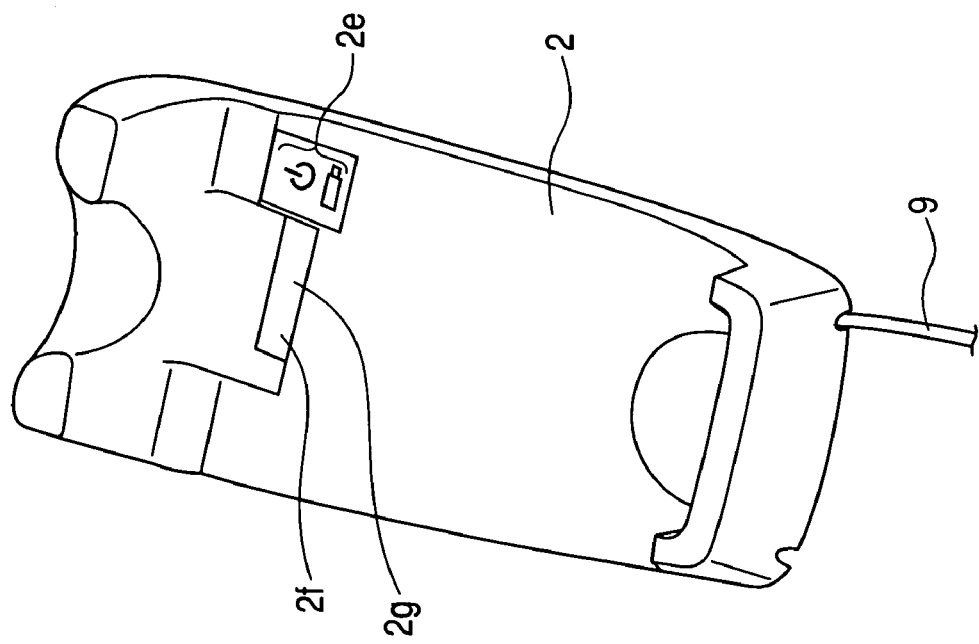
FIG. 2A is a diagram showing the terminal holder separated from a communication module when viewed from above.

As shown in FIG. 2B, the communication module 3 has a box shape, and the base 2 has a hollow portion 5 at its bottom for housing therein the communication module 3. The base 2 has also a protruding plate 6 at its bottom inwardly protruding from an outer end 5a of the hollow portion 5 so as to cover a part of the hollow portion 5. This protruding plate 6 enables the communication module 3 to be snapped into the hollow portion 5.

FIGS. 3A and 3B are perspective views of the communication modules. As shown in these figures, the communication module 3 has, at its sidewall, connectors 3a and 3b, and, at its top surface 3c, an indicator including a communication status lamp 3d for indicating the status of the cable communication and wireless communication and a power lamp 3e for indicating the status of power supply from a host computer or host computer 6. A user can know the communication status and the power supply status by checking on/offs (or the changes of blinking frequency or display colors) of the communication status lamp 3d and the power lamp 3e that have their respective symbolic shapes.

As shown in FIG. 3B, the communication module 3 has also a set-up switch 3g at its bottom surface 3f on which a label 3h is stuck. When the user pushes the set-up switch 3g, a reset signal is supplied to a communication control circuit 8 (see FIG. 6), so that the communication control circuit 8 resets the whole of the communication module 3. The label 3h, which is printed and stuck on the bottom surface 3f of the communication module 3 during manufacturing process of the communication module 3, bears information codes Q such as QR codes containing an ID assigned to the communication module 3 (serial number, for example) for identifying the communication module 3 as a wireless station.

As shown in FIG. 2A and FIG. 2B, the base 2 has a window 2f covered by a protective transparent plate 2g. When the communication module 3 is fitted in the base 2, the lamps 3d, 3e of the communication module 3 face the transparent plate 2g of the window 2f of the base 2, so that the user can view the lamps 3d, 3e from above the base 2 thorough the window 2f as seen from FIG. 1.

When the communication module 3 is separated from the base 2, the user can use them as separate devices. The communication module 3 is connected, by a communication cable 7, to the host computer 6 installed in a certain location. The base 2 receives electric power from a power supply device (not shown) through a power cable 9 having a length of 2 to 3 m. The communication cable 7, which includes power wires and data wires, is connected to the connector 3a of the communication module 3 as shown in FIG. 3A. The communication cable 7 has a length of 1 to 2 m. In this embodiment, the communication cable 7 is a USB (Universal Serial Bus) type cable. The connector 3b is for serial data transmission through a RS-232C type cable (not shown). The connector 3b may used for relaying key information from a keyboard (not shown) connected to the connector 3b by a relay cable to the host computer 6.

Figure 4:
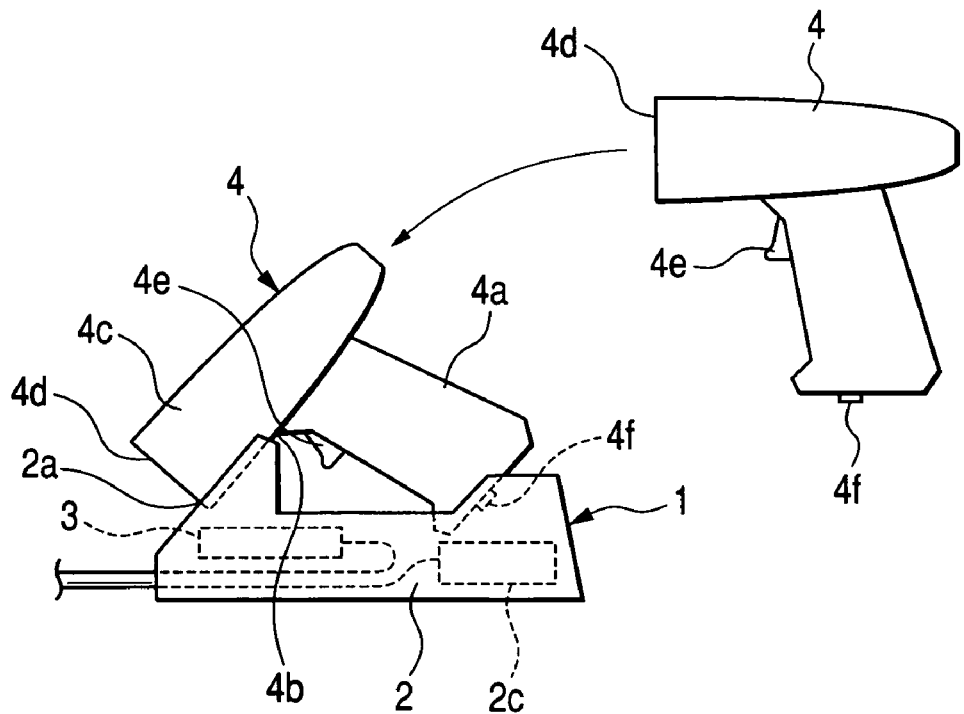
FIG. 4 is a diagram showing a scanner unit placed on the terminal holder.

The scanner unit 4 is made in a size that the user can handle it with one hand. As shown in FIG. 4, the scanner unit 4 includes a grasping part 4a, a bend part 4c connected to a shoulder 4b of the grasping part 4a, and having a reading mouth 4d at its front end. The grasping part 4a has a trigger switch 4e. The holder 1 has a depression 2a at its top side in which the shoulder 4b of the scanner unit 4 fits when the scanner unit 4 is placed on the holder 1.

The grasping part 4a of the scanner unit 4 is provided with charging terminals 4f at its bottom end. Also the base 2 is provided with charging terminals 2b that make contact with the charging terminals 4f of the scanner unit 4 when it is placed on the holder 1.

Figure 5:
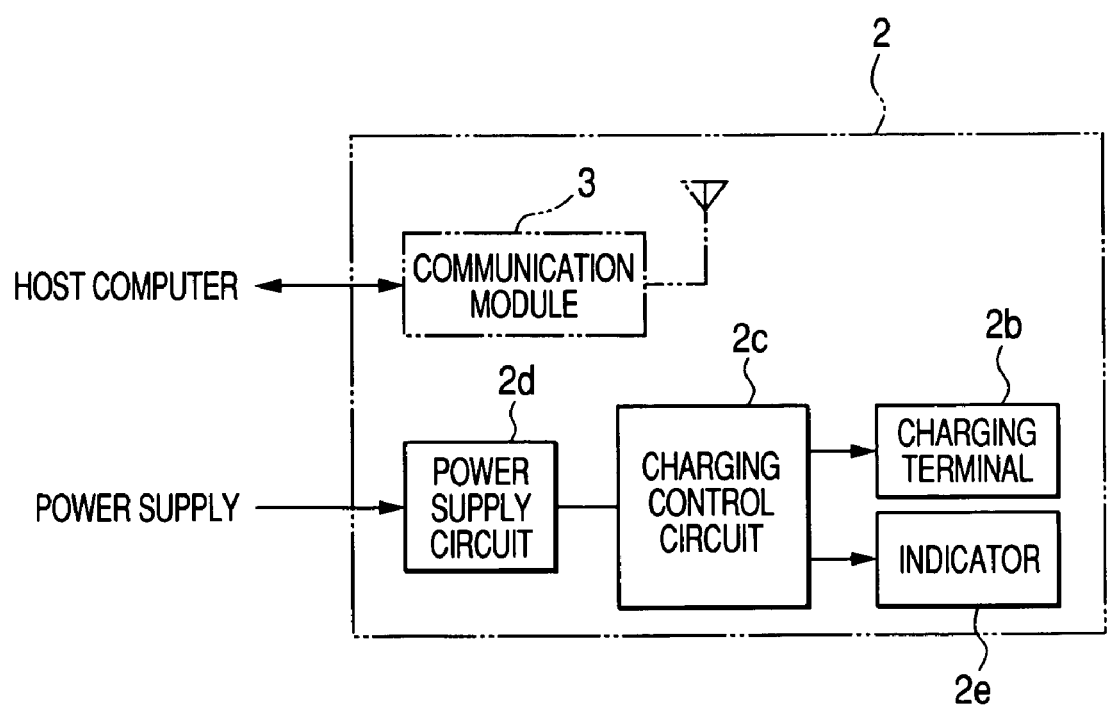
FIG. 5 is a block diagram showing an electrical configuration of the base.

FIG. 5 is a block diagram showing an electrical configuration of the base 2. As shown in this figure, the base 2 has a power supply circuit 2d, a charging control circuit 2c powered by the power supply circuit 2d, and an indicator 2e connected to the charging control circuit 2c. The charging control circuit 2c applies a dc charging voltage to the charging terminals 2b. The indicator 2e, which may be constituted by LEDs, has a power status indicating part 2j for indicating the status of electric power supply from outside, and a charging status indicating part 2h for indicating the status of charging the scanner unit 4 through the charging terminals 2b.

When the charging terminals 4f of the scanner unit 4 are in contact with the charging terminals 2b of the base 2, a current depending on the dc voltage applied to the charging terminals 2b of the base 2 flows through a rechargeable battery 10 (see FIG. 7) built in the scanner unit 4. The charging control circuit 2c detects this charging current, and control the LED of the charging status indicating part 2h of the indicator 2e to blink or light depending on the level of this charging current.

Figure 6:
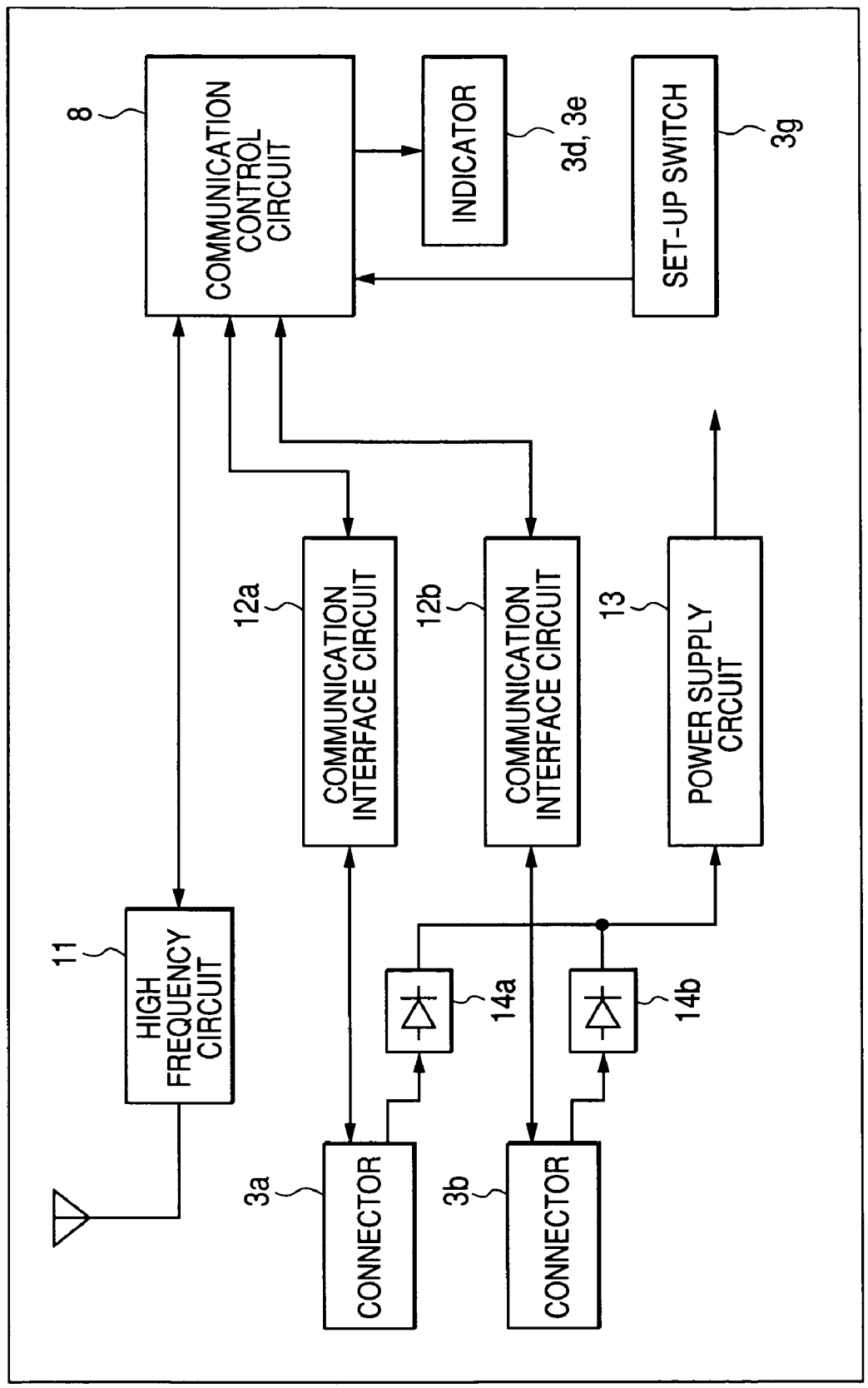
FIG. 6 is a block diagram showing an electrical configuration of the communication module.

FIG. 6 is a block diagram showing an electrical configuration of the communication module 3. As shown in this figure, the communication module 3 includes a communication control circuit 8, a high frequency circuit 11, the connectors 3a and 3b, communication interface circuits 12a and 12b, the indicators 3d and 3b, power supply circuit 13, and diodes 14a and 14b serving as back-flow preventing device. The communication control circuit 8 and the high frequency circuit 11 constitute a radio communication device. The communication control circuit 8 and the communication interface circuits 12a, 12b constitute a cable communication device. The communication control circuit 8 is configured to perform short-range radio communication in conformity with the Blue-tooth standard, for example. The communication control circuit 8 may be configured to perform radio communication in conformity with other radio communication standards.

The communication control circuit 8 is also configured to perform cable data communication with the host computer 6 through the communication interface circuits 12a, 12b and the connectors 3a, 3b. A current flowing from one of the connectors 3a and 3b to the power supply circuit 13 can be prevented from flowing to the other of the connectors 3a and 3b by the diode 14a or 14b.

Figure 7:
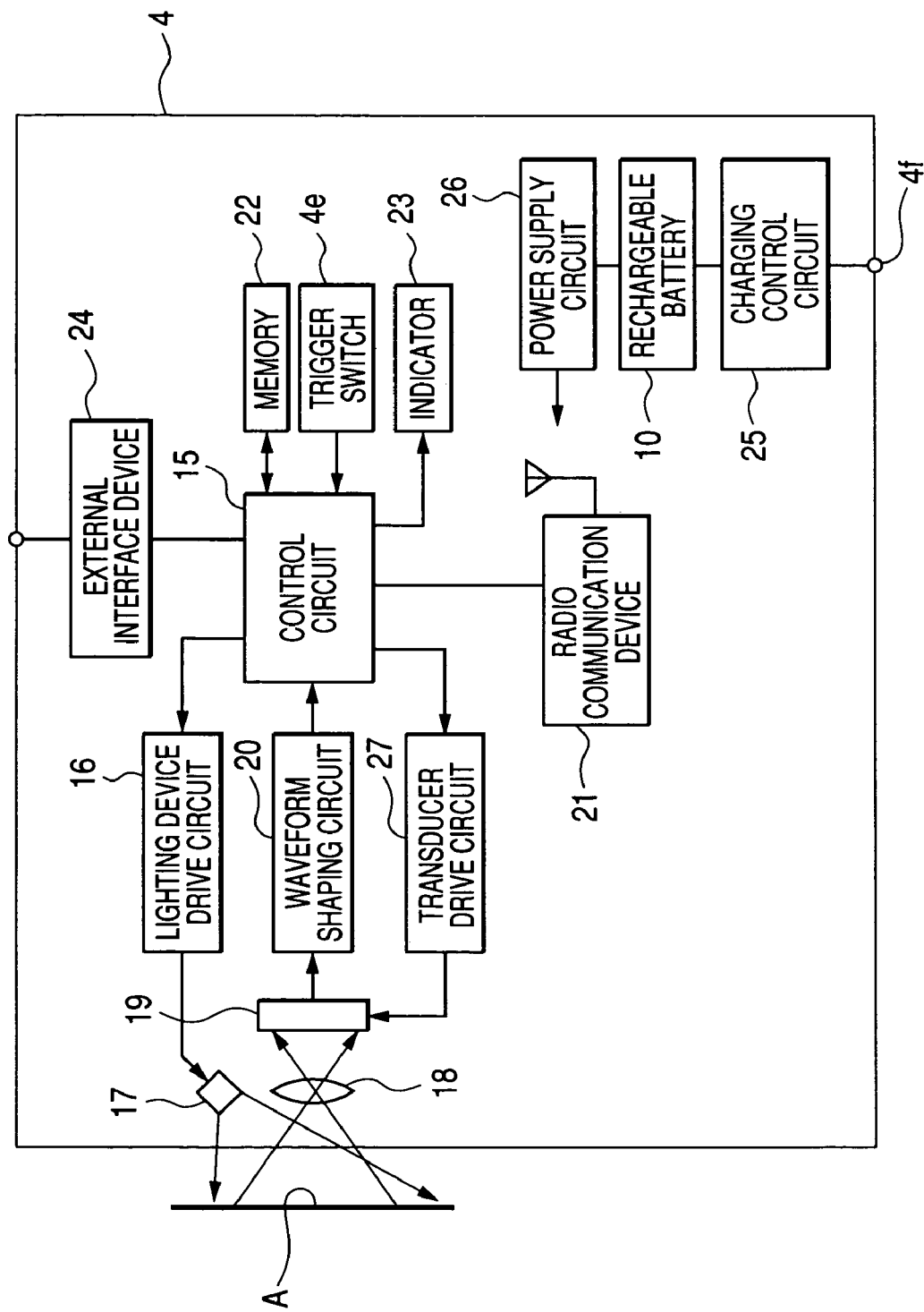
FIG. 7 is a block diagram showing an electrical configuration of the scanner unit.

FIG. 7 is a block diagram showing an electrical configuration of the scanner unit 4. The scanner unit 4 includes a control circuit 15, a lighting device drive circuit 16, a lighting device 17 constituted by LEDs, for example, an imaging device 18, an optoelectronic transducer 19, a waveform shaping device 20, a radio communication device 21, the trigger switch 4e, a memory 22, an indicator 23 constituted by LEDs, an external interface device 24, a charging control circuit 25, a power supply circuit 26, and a transducer drive circuit 27. The scanner unit 4 is so configured that, when the charged rechargeable battery 10 is set in place, the power supply circuit 26 supplies a source voltage to each section of the scanner unit 4, and that, when a certain voltage is applied to the charging terminals 4f, the charging control circuit 25 charges the rechargeable battery 10.

Upon detecting depression of the trigger switch 4e, the control circuit 15 outputs a drive signal to the lighting device drive circuit 16, In response to the drive signal, the lighting device drive circuit 16 causes the lighting device 17 to emit light. The emitted light is reflected by a target object A to be read and enters the imaging device 18. The imaging device, which may be constituted by lenses, forms an image corresponding to an information code such as a barcode or a QR code printed in the target object A.

The optoelectronic transducer 19, which may be a CCD sensor, transforms the image formed by the optoelectronic transducer 19 into analog signals. The waveform shaping circuit 20 converts the analog signals received from the optoelectronic transducer 19 into digital signals. The control circuit 15 operates to store the digital signals in the memory or supply them to the radio communication device 21.

The radio communication device 21 has a short-range radio communication capability in conformity with the Blue-tooth standard, for example, and is configured to transmit the digital signals received from the control circuit 15 to the communication module 3 attached in the holder 1. As explained above, the control circuit 15 and the radio communication device 21 enable the short-range radio communication based on the Blue-tooth standard between the scanner unit 4 and the holder 1 which may be distant from each other by up to 10 m.

Next, usage patterns of the scanner unit 4 are explained. First, explanation is made about a case where the communication module 3 is attached in the base 2 with reference to FIG. 8A.

The indicators 3d, 3e of the communication module 3 fitted in the hollow portion 5 of the base 2 can be viewed from above through the window 2f and the transparent plate 2g as seen from FIG. 1. At this time, the indicators 3d, 3e of the communication module 3 and the indicator 2e of the base 2 are adjacent to each other, and accordingly, the user can recognize those indicators at once.

When the communication module 3 is attached in the base 2 to operate as a part of the holder 1, the charging function by the charging control circuit 2c of the base 2, the short-range radio communication function by the communication control circuit 8 and high frequency circuit 11 of the communication module, 3, and the cable communication function by the communication control circuit 8 of the communication module, 3 are performed at the same location (at the holder 1). When the scanner unit 4 is placed on the holder 1, and the charging terminals 2b of the holder 1 are in contact with the charging terminals 4b of the scanner unit 4, the charging control circuit 2c of the base 2 and the charging control circuit 25 of the scanner unit 4 begin charging the rechargeable battery 10 of the scanner unit 4, and the control circuit 15 causes the indicator 23 to blink or light.

If the host computer 6 sends, through the communication cable 7, a communication request to the holder 1 on which the scanner unit 4 is placed, the communication control circuit 8 of the communication module 3 attached in the holder 1 sends a communication request signal to the control circuit 15 of the scanner unit 4 through the high frequency circuit 11 of the communication module 3 and the radio communication device 21 of the scanner unit 4. Upon receiving the communication request signal, the control circuit 15 of the scanner unit 4 sends a reply signal to the host computer 6 through the communication control circuit 8 of the communication module 3 in order to establish connection between the scanner unit 4 and the host computer 6. After that, the cable communication and wireless communication are performed for data transmission between the scanner unit 4 and the host computer 6.

Next, explanation is made about a case where the communication module 3 is detached from the base 2 with reference to FIG. 8B. When the communication module 3 is detached from the base 2, each of them can be used alone. More specifically, as shown in FIG. 6B, if the user detaches the communication module 3 from the base 2 and brings only the base 2 to a workplace where the user works on reading information codes by use of the scanner unit 4, and plugs the power cable 9 of the base 2 to a nearby receptacle (not shown), the user can charge the rechargeable battery 10 at any time without going out of the workplace even in a case where the workplace is distant from the host computer 6 (5 to 10 m distant, for example), and the communication cable 7 for connection between the host computer 6 and the communication module 3 has a length of 2 to 3 m Accordingly, the user can save the trouble of going back to the side of the host computer 6 for charging the rechargeable battery 10. This improves working efficiency.

As explained above, since the portable-terminal holder 1 according to this embodiment is so configured that the communication module 3 is detachable from the base 2, and each of them can be used alone when they are separated, the user can use the charging function, the short-range radio communication function, and the cable communication function in the workplace even if the workplace is distant from the host computer 6.

Although the communication module 3 is supplied with electric power from the host computer 6 in the above described embodiment, it may be supplied with electric power from an AC adapter connected to a nearby power outlet.

The present invention is also applicable to cradles for cellular phones or PDAs.

Second Embodiment

FIG. 9 is a diagram showing a schematic structure of a radio communication system S used for reading information codes according to a second embodiment of the invention. As shown in this figure, the radio communication system S includes a host computer P, a plurality of portable scanner units B1 to B6 (collectively represented by B hereinafter) having the same structure, and one or more relay units A1 to A3 (collectively represented by A hereinafter) having the same structure. The scanner units B and the relay units A constitute a local area network N.

The relay units A are cable-connected to the host computer P through a hub H such as a USB (Universal Serial Bus). The scanner units B are radio-connected to the relay units A which serve also as holders of the scanner units A.

Figure 10A:
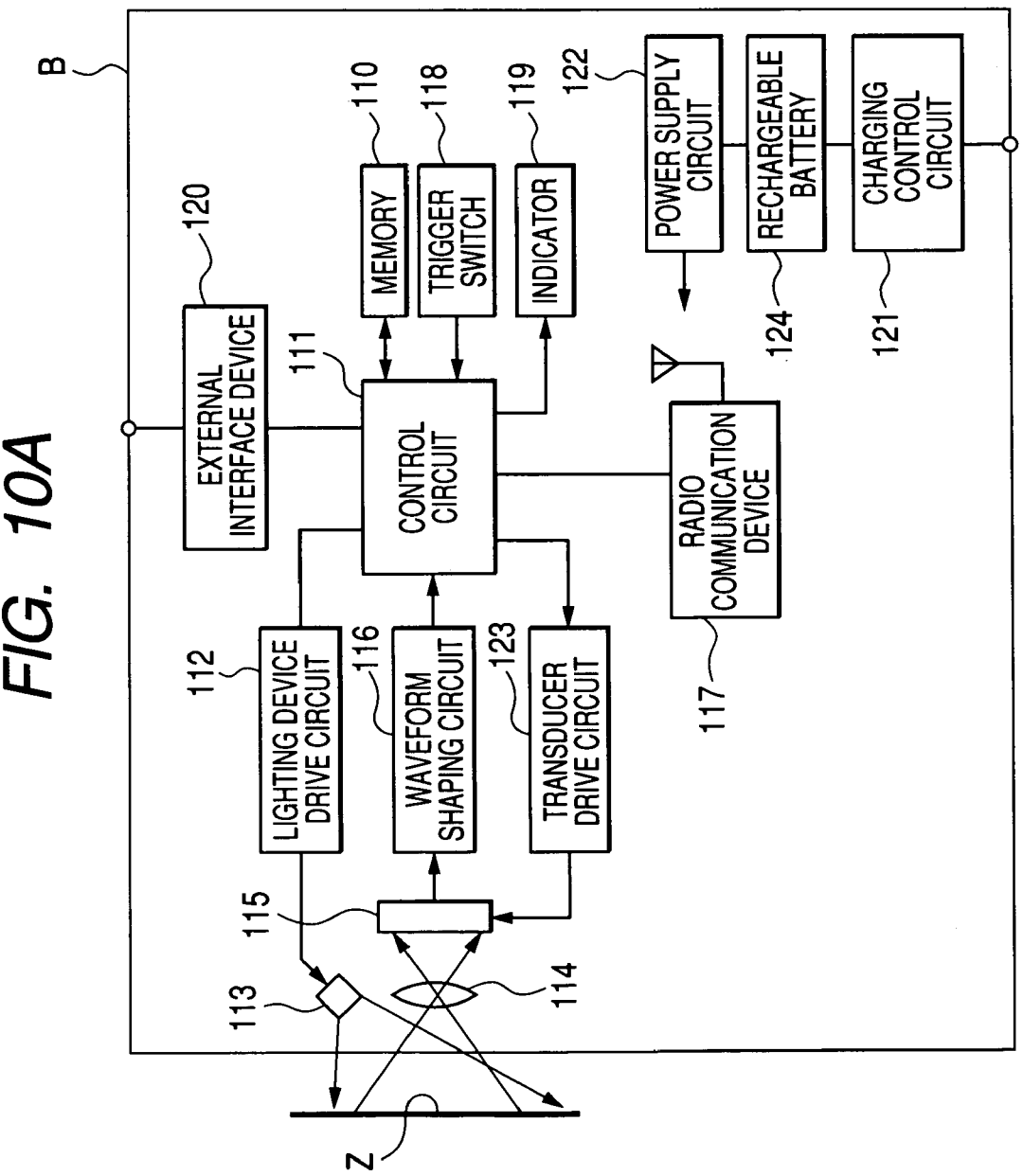
FIG. 10A is a block diagram showing an electrical configuration of a scanner unit included in the radio communication system according to the second embodiment.

FIG. 10A is a block diagram showing an electrical configuration of the scanner units B. The scanner units B include a control circuit 111, a lighting device drive circuit 112, a lighting device 113 constituted by LEDs, for example, an imaging device 114, an optoelectronic transducer 115, a waveform shaping device 116, a radio communication device 117, a trigger switch (function switch) 118, a memory device 110, an indicator 119 constituted by LEDs, an external interface device 120, a charging control circuit 121, a power supply circuit 122, and a transducer drive circuit 123. The scanner units B are so configured that, when a charged rechargeable battery 124 is set in place, the power supply circuit 122 supplies a source voltage to each section of the scanner units B.

Figure 10B:
FIG. 10B is a diagram showing a QR code to be read as an information code by the scanner unit.
Figure 10C:
FIG. 10C is a diagram showing a barcode to be read as an information code by the scanner unit.

Upon detecting depression of the switch 118, the control circuit 111 outputs a drive signal to the lighting device drive circuit 112. In response to this drive signal, the lighting device drive circuit 112 causes the lighting device 113 to emit light. The emitted light is reflected by a target area Z to be read, and enters the imaging device 114. The imaging device 114, which may be constituted by lenses, forms an image corresponding to an information code J such as a QR code or a barcode in the target area Z (see FIGS. 10B, 10C).

The optoelectronic transducer 115, which may be a CCD sensor, transforms the image formed by the imaging device 114 into analog signals. The waveform shaping device 116 converts the analog signals received from the optoelectronic transducer 115 into digital signals. The control circuit 111 operates to store the digital signals in the memory device 110 or supply them to the radio communication device 117. The control circuit 111 also operates to inform the outside of the completion of reading the target zone Z by use of the LEDs of the indicator 119 or the radio communication device 117.

The control circuit 111 can obtain a local ID or an absolute ID (Bluetooth address) of a communication target (the relay unit A1, for example) through cable communication with the outside by use of the external interface device 120. The indicator 119 has a reading status lamp for indicating the status of reading the information code J, a power lamp for indicating the status of electric power supply, and a radio communication status lamp for indicating the status (active/nonactive) of short-range radio communication. However, the scanner units B are not provided with capabilities for displaying communication terminals and selecting, from among them, a target communication terminal.

The memory device 110 includes a nonvolatile memory such as a flash memory and a volatile memory. The nonvolatile memory contains an absolute ID uniquely assigned to the radio communication device 117. In the following, explanation is made for a case where the local area network N is based on the Bluetooth standard, and the absolute ID is an Bluetooth address. The Bluetooth address is described as a 48-bit code constituted by an LAP (Lower Address Part having a 24-bit length), an UAP (Upper Address Part having a 8-bit length), and an NAP (Non-Significant Address Part having 16-bit length). The LAP part is an identifier which each manufacturer can define individually. The UAP part and the NAP part are identifiers defined by IEEE 802, which are assigned to each manufacturer. Generally, these identifiers are expressed in binary notation or hexadecimal notation, and accordingly they are hard for the user to recognize.

The nonvolatile memory of the memory device 110 also contains a local ID defined by the manufacturer or by the user, which is used for distinction in the local area network N. The local ID may be the manufacturer's serial number, or a comprehensible set of characters or marks specified by the user or manufacturer (for example, "SCANNER", "UNIT"). The absolute ID and the local ID are stored as a pair in the nonvolatile memory of the memory device 110.

The radio communication device 117 having a capability of performing the short-range radio communication based on the Bluetooth standard is configured to transmit data received from the control circuit 11 to the relay units A. The relay units A are configured to perform the cable communication with the host computer P and to perform the short-range radio communication based on the Bluetooth standard with the scanner units B.

FIG. 11 shows an electrical configuration of the relay units A. As shown in this figure, the relay units A include a control circuit 131, a radio communication device 132, a communication interface circuit 133, a memory device 130, an indicator 134 constituted by LEDs, and a power supply circuit 135. The indicator 134 includes a power lamp for indicating the status of electric power supply, and a radio communication status lamp for indicating the status (active/nonactive) of the short-range radio communication. However, the relay units A are not provided with capabilities for displaying communication terminals, and selecting, from among them, a target communication terminal.

The power supply circuit 135 is configured to generate a power supply voltage from electric power supplied from the host computer P, and supplies it to each section within the relay unit A. The control circuit 131 of the relay unit A is configured to perform the cable communication with the host computer P thorough the communication interface circuit 133, and to perform the short-range radio communication based on the Bluetooth standard with the scanner unit B through the radio communication device 132 as described in detail later.

The memory device 130 includes a nonvolatile memory such as a flash memory and a volatile memory. The nonvolatile memory contains an absolute ID specific to the relay unit A. This absolute ID is an address (the Bluetooth address in this embodiment) uniquely assigned to the communication interface circuit 133 of the relay unit A. The memory device 130 also contains a local ID which the user inputs to the relay unit A through its communication interface circuit 133 by use of the host computer P. The local ID may be the manufacturer's serial number, or a comprehensible set of characters or marks specified by the user or manufacturer (for example, "RELAY", "UNIT"). The manufacturer or user can use any identifier other than reserved words as the local ID.

Although the local ID is an identifier specific to each scanner unit B or relay unit A within the local area net work, if they are grouped, the same identifier can be used for one or more scanner units or relay units which belong to the same group. The control circuit 11 of the scanner unit B and the control circuit 131 of the relay unit A operate to perform the short-range radio communication within a distance of up to 10 m based on the Bluetooth standard through the radio communication device 117 of the scanner unit B and the radio communication device 132 of the relay unit A. The data transmitted between the scanner unit B and the relay unit A is character data including character codes (ASCII codes in this embodiment).

Figure 12A:
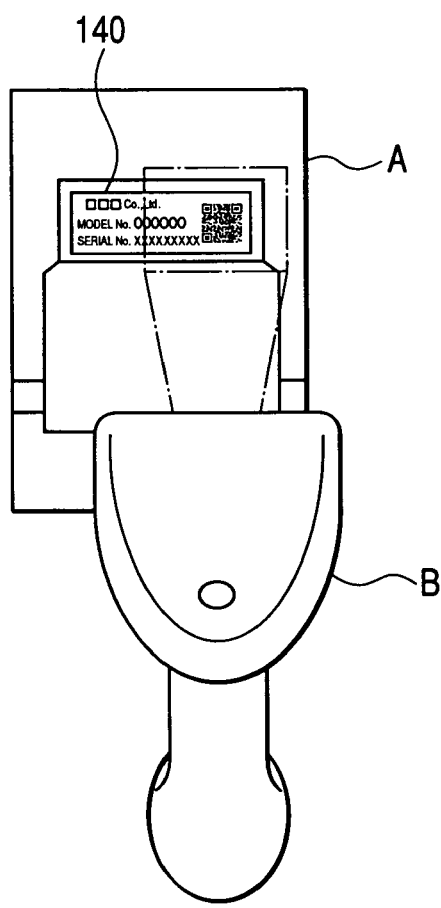
FIG. 12A is a diagram showing a nameplate stuck to the bottom surface of the relay unit and read by the scanner unit.
Figure 12B:
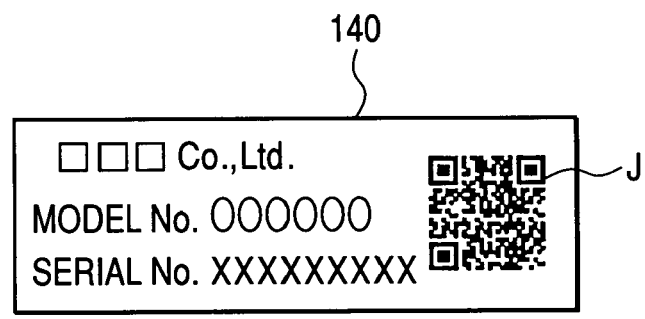
FIG. 12B is a magnified view of the nameplate.

FIGS. 12A and 12B show an example of a nameplate stuck to the bottom surface of the relay unit A. As shown in these figures, the nameplate 140 contains the business name of the manufacturer of the relay unit A, the model number and the serial number of the relay unit A, etc. The nameplate 140 also contains an information code J (a two-dimensional code such as a QR code or a one-dimensional code such as a barcode) expressing the local ID of the relay unit A (the business name, model number and serial number). To register the relay unit A in the memory device 110 of the scanner unit B, the user optically reads the information code J by use of the scanner unit B as shown in FIG. 12A.

This registering process is explained below in detail with reference to the sequence diagram shown in FIG. 13. First, the user optically reads the information code J expressing the local ID of the relay unit A1 to be registered in the scanner unit B1 by use of this scanner unit B ((1) in FIG. 13). Assume that the model number is represented by 10 characters of "1234567890", and the serial number is represented by 6 characters of "123456".

The control circuit 111 converts the model number to a certain code by a predetermined rule. Here, assume that the model number "1234567890" is converted to "GT10BS". The control circuit 111 combines the converted model number "GT10BS" and the serial number "123456" into "GT10BS123456" ((2) in FIG. 13), and stores it in the memory device 110 ((3) in FIG. 13). The control circuit 111 may directly combine the model number not converted and the serial number as they are.

Next, explanation is made as to how the scanner unit B1 and the relay unit A1 establish the connection. The control circuit Ill of the scanner unit B1 transmits a search signal together with the Bluetooth address assigned to the scanner unit 51 through the radio communication device 117 in order to search for any unit with which the scanner unit B1 can communicate ((4) in FIG. 13) This search signal is received by the radio communication device 132 of the relay unit A1 as well as the radio communication devices 117 of the scanner units B2, B3. Upon receiving the search signal, each of the control device 131 of the relay unit A1 and the control devices 111 of the scanner units B2, B3 reads its own local ID (the model number and the serial number) and the Bluetooth address from the memory 30 or 10 ((5) in FIG. 13), and return them to the scanner unit B1 ((6) in FIG. 13).

Here, it is assumed that the local ID returned from the relay unit A1 is "GT10BS123456", the local ID returned from the scanner unit 82 is "HC36BS123456", and the local ID returned from the scanner unit B3 is "HC56BL123456". The control circuit 111 of the scanner unit B1 performs validation on the received local IDs.

Here, the validation process performed by the control circuit 111 of the scanner unit B and by the control circuit 131 of the relay unit A is explained below with reference to FIGS. 14A, 14B and FIGS. 15A, 15B. The validation process can be classified into an absolute validation process, and a relative validation process (similarity determination process).

Figures 14A, 14B:
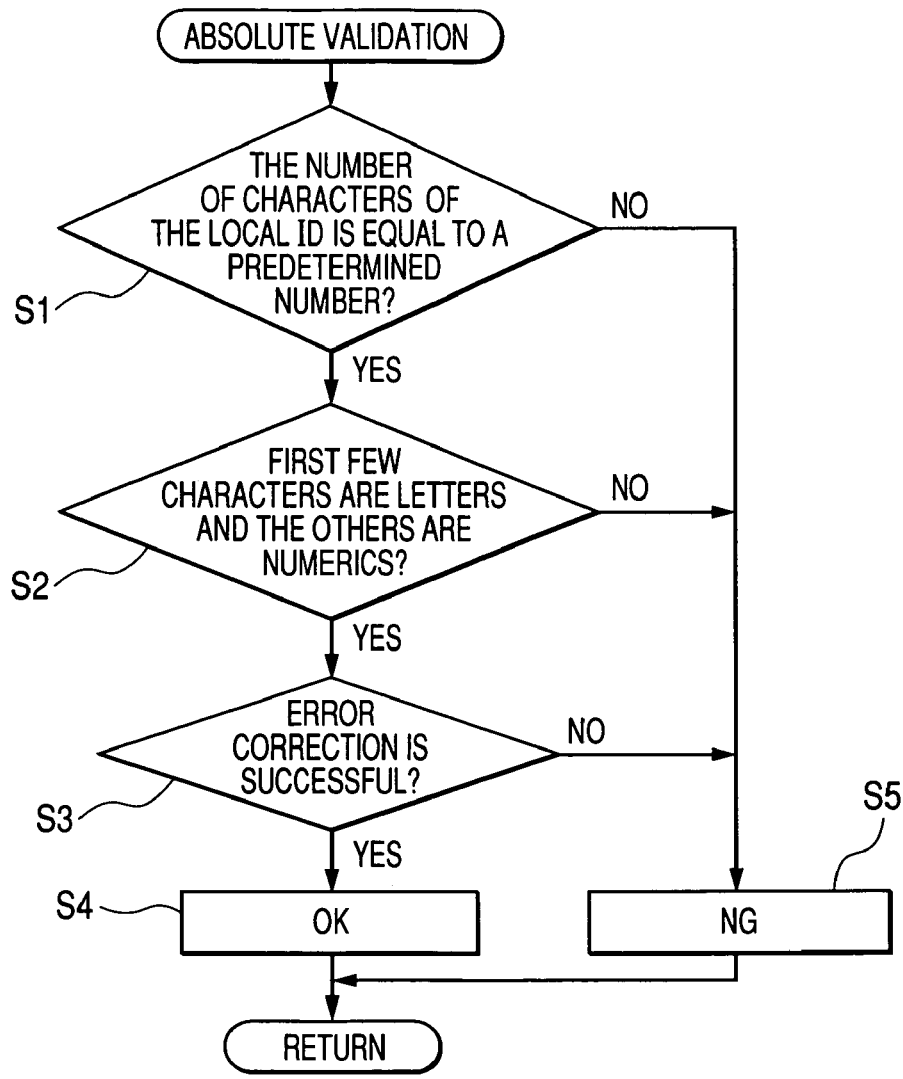
FIG. 14A is a flowchart showing an example of an absolute validation process.
FIG. 14B is a diagram showing an example of the results of the absolute validation process.

The absolute validation process is a process that makes a determination whether or not the received local ID satisfies predetermined conditions (ID format) regardless of the contents of the local ID. FIG. 14A is a flowchart showing an example of the absolute validation process.

At step S1, the scanner unit B or relay unit A checks whether or not the number of characters included in the received local ID is equal to a predetermined number. At step S2, it is checked whether or not the first few characters of the received local ID are characters of a predetermined type. For example, it is checked whether or not the first few characters of the received local ID are letters (alphabetical characters), and the others are numerics. At step S3, it is checked whether or not error correction (error detection) on the received local ID has been successful. If all the check results of steps S1 to S3 are "YES", it is determined that the received ID is valid ("OK" at step S4). If the check result of any one of steps S1 to S3 is "NO", it is determined that the received ID is not valid ("NG" at step S5).

FIG. 14B shows examples of the result of the absolute validation process in a case where step S1 checks whether or not the number of characters included in the received local ID is 9, step S2 checks whether or not the first 2 characters included in the received local ID are letters, and step S3 has determined that the error correction on the received local ID has been successful. As shown in this figure, if the received local ID is "DE1000000", or "BA1023456", the validation result becomes "OK (valid)". If the received local ID is "DE000" or "0000000DE" or "ADAPTER00", the result becomes "NG (invalid)". The absolute validation process may further include a step for judging whether or not the received local ID contains the manufacturer's information (specific model number "GT10BS", or specific serial number "123456"). Alternatively, the absolute validation process may perform this judging step instead of the above described steps S1 to S3.

Figures 15A, 15B:
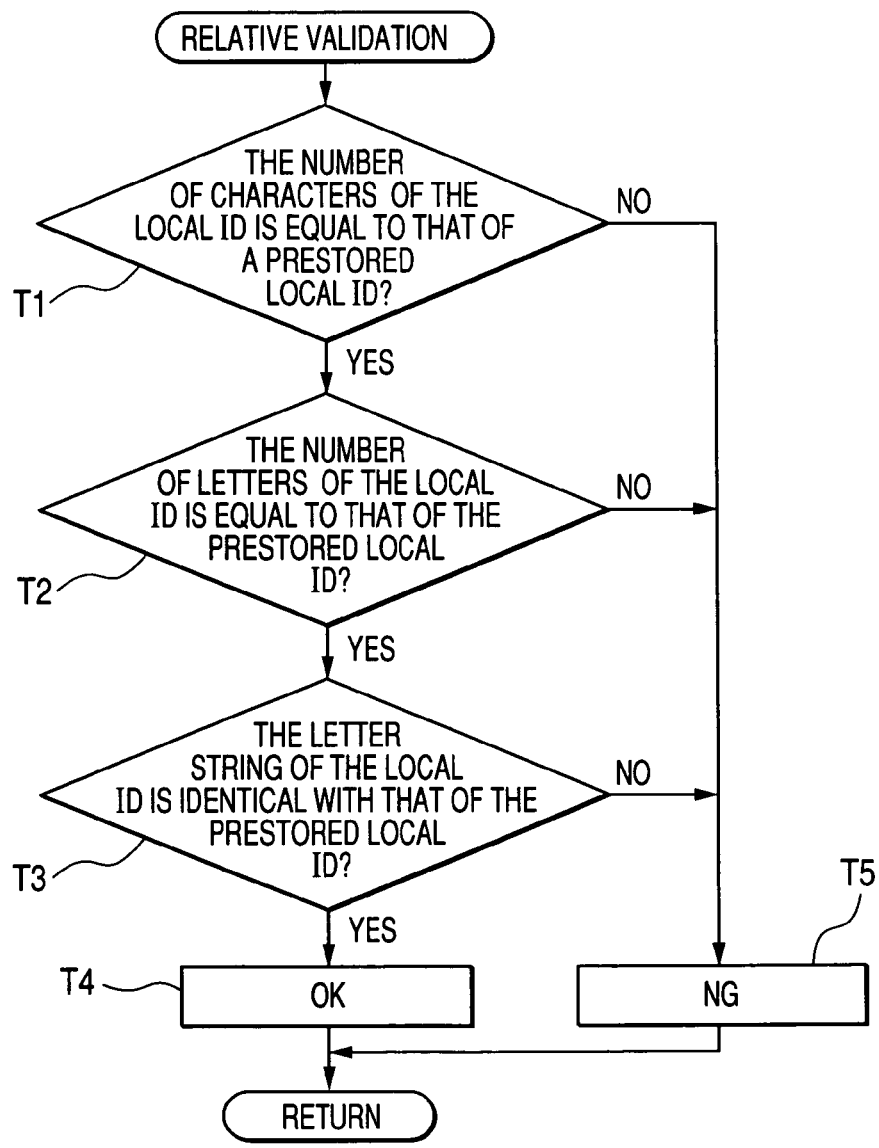
FIG. 15A is a flowchart showing an example of a relative validation process.
FIG. 15B is a diagram showing an example of the results of the relative validation process.

The relative validation process (similarity determination process) is a process that makes a determination whether or not the received local ID has affinities with the local ID prestored in the memory device 110 or 130, or the local ID optically read by the scanner unit B. FIG. 15A is a flowchart showing an example of the relative validation process.

At step T1, the scanner unit B or relay unit A checks whether or not the number of characters included in the received local ID is equal to the number of characters included in the local ID prestored in its memory device. At step T2, the scanner unit B or relay unit A checks whether or not the number of characters of a specific type (alphabetical character, for example) included in the received local ID is equal to the number of characters of this specific type included in the local ID prestored in its memory device. At step T3, the scanner unit B or relay unit A checks whether or not a character string constituted by the characters of the specific type included in the received local ID coincides with a character string constituted by the characters of this specific type included in the local ID prestored in its memory device. If all the check results of steps T1 to T3 are "YES", it is determined that the received ID is valid ("OK" at step T4). If the check result of any one of steps T1 to T3 is "NO", it is determined that the received ID is not valid ("NG" at step T5).

FIG. 15B shows examples of the result of the relative validation process in a case where the local ID prestored in the memory device 110 or 130 is "DE1012345". In this case, if the received local ID is "DE1000000" or "0000000DE", the validation result becomes "OK", since they are constituted by 9 characters including two letters, and include the character string "DE". Even if the received local ID contains a character string of letters, when it does not include 9 characters in total ("DE000", for example), when the number of letters constituting the character string is not two ("ADAPTER00", for example), or when the character string is not "DE" ("BA1023456", for example), the validation result becomes "NG".

The relative validation process may further include a step that the scanner unit B or relay unit A judges whether or not a specific part of the received local ID (the first two characters, for example) is identical with a corresponding part of the local ID in its memory device, or judges whether or not they completely coincide with each other. Alternatively, the relative validation process may perform this judging step instead of the above described steps T1 to T3. The scanner unit B or the relay unit A performs one of the absolute validation process and the relative validation process on the received local IDs.

Returning to FIG. 13, when the scanner unit B1 receives the local ID "HC36BS123456" returned from the scanner unit B2 or the local ID "HC56BL123456" returned from the scanner unit B3, the scanner unit B1 determines them to be invalid ("NG" in (7) in FIG. 13) by performing the validation process similar to the absolute validation process or relative validation process explained above with reference to FIGS. 14A, 15A. In this case, the relay unit B1 transmits the search signal again. On the other hand, when the scanner unit B1 receives the local ID "GT10BS123456" returned from the relay unit A1, the scanner unit B1 determines it to be valid ("OK" in (7) in FIG. 13). In this case, the control circuit 111 of the scanner unit B1 sets, as a Bluetooth address of a called party (relay unit A1), the absolute ID (for example, "BBBXYY" where B, X, Y are 8-bit identifiers) returned from the relay unit A1 together with its local ID, sets its own Bluetooth address as a Bluetooth address of a calling party (scanner unit B1), and transmits a communication request signal ((8) in FIG. 13).

Figure 13:
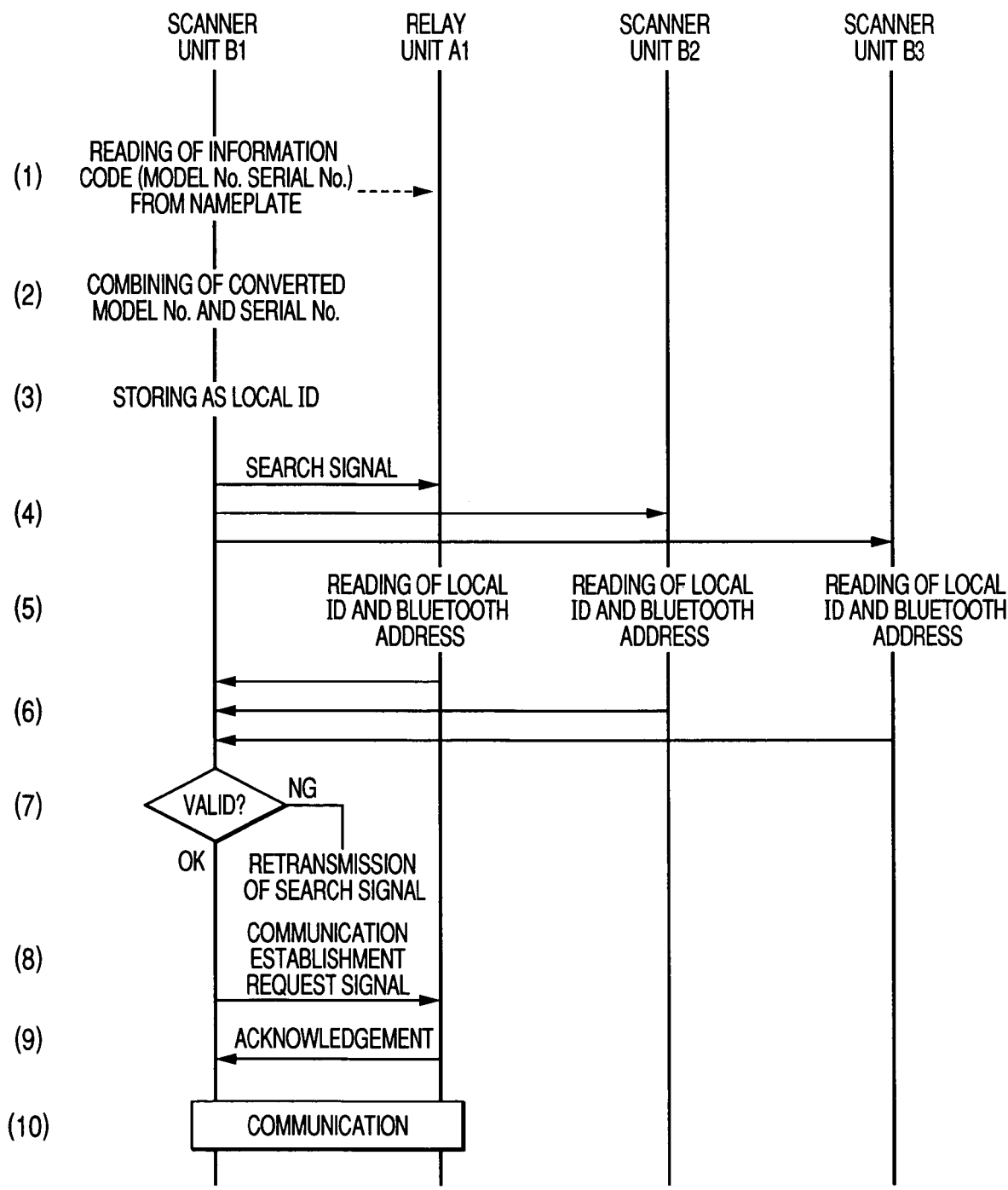
FIG. 13 is a sequence diagram showing communication status of the radio communication system according to the second embodiment.

The control circuit 131 of the relay unit A1 makes a response to this communication request signal ((9) in FIG. 13), thereby starting the communication with the scanner unit B1 ((10) in FIG. 13).

As explained above, the radio communication system according to this embodiment includes the scanner units B having the capability of optically reading information codes and the capability of performing the short-range radio communication based on the Bluetooth standard, the relay units A having the capability of performing the short-range radio communication with the scanner units B, and the host computer P configured to receive the information codes from the scanner units B through the short-range radio communication between the scanner units B and the relay units A and through the cable communication between the relay units A and the host computer P. Each of the relay units A and the scanner units B contains its own model number and serial number together with its Bluetooth address in its memory device 110 or 130.

The relay units A have the nameplate 40 bearing the model number and the serial number as the information code J. The scanner unit B1 reads the information code J in the nameplate 140 of the relay unit A1 and stores it in its memory device 110. In response to the search signal transmitted from the scanner unit B1, the other scanner units B2, B3 and the relay unit A1 return their local IDs containing their model numbers and serial numbers together with their absolute IDs. The scanner unit B1 performs validation on these local IDs by comparing them with the local ID prestored in its memory device. The scanner unit B1 transmits the communication request signal to the communication target (relay unit A1) whose local ID has been determined to be valid, and the communication target makes a response to this communication request signal for starting communication with the scanner unit B1. With this embodiment, the user of the scanner unit B can easily set an absolute ID of a communication target in the scanner unit B, even if the scanner unit B is not provided with a function of displaying communication terminals and selecting, from among them, a target communication terminal.

In a case where the user can freely determine local IDs of communication terminals constituting a local area network, preferably, they are comprehensible character strings. If the nameplate of the relay unit A contains information specific to the manufacturer of the relay unit A (model number or serial number, for example), it becomes possible for the manufacturer to save the trouble of putting the Bluetooth address in the nameplate 140, because the information specific to the manufacturer can be used as the local ID of the relay unit A.

Third Embodiment

Figure 16:
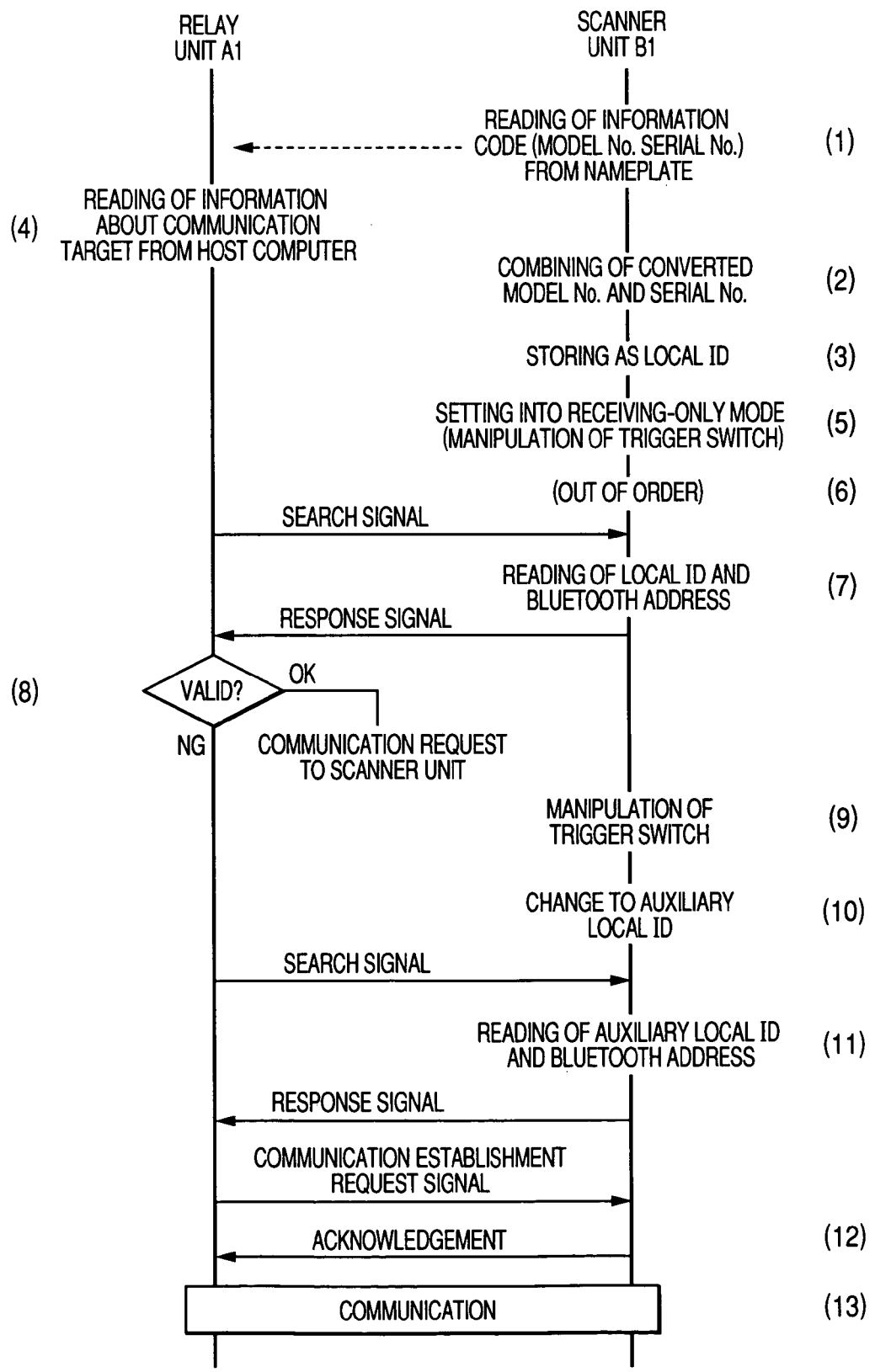
FIG. 16 is a sequence diagram showing communication status of a radio communication system according to a third embodiment of the invention.

FIG. 16 is a sequence diagram explaining an operation of the radio communication system according to a third embodiment of the invention. The third embodiment is different from the second embodiment in that the third embodiment uses an auxiliary local ID for establishing communication in an emergency mode or a test mode, and that the scanner units has a receiving-only mode.

The auxiliary local ID is prestored in the nonvolatile memory of the memory device 110 or 130. The auxiliary local ID is used instead of the regular local ID explained in the second embodiment when the radio communication system is in fault condition, or when fault diagnosis is performed, or when the radio communication system is in an auxiliary mode (test mode or emergency mode). The auxiliary local ID is assigned in common to all the relay units A1 to A3 and the scanner units B1 to B6 constituting the local network N. The auxiliary local ID may be used for validating received local IDs when the radio communication system is in a normal mode. In this embodiment, it is assumed that the auxiliary local ID is "WC", and it is assigned in common to the relay units A1 to A3 and the scanner units B1 to B6.

When the scanner units B are in the receiving-only mode, they await the search signal without transmitting the search signal, and, upon receiving the search signal, transmit their local IDs or the auxiliary local ID together with their Bluetooth addresses in response to the search signal.

The following is explanation about a case where the scanner unit B1 is set in the receiving-only mode and the relay unit A1 transmits the search signal.

As in the case of the second embodiment, the information code J expressing the model number and serial number appearing on the nameplate 140 of the relay unit A1 is read by the scanner unit B1, and the model number is converted into a unique code. And the combination of this unique cod and the serial number is stored in the memory device 110 of the scanner unit B1 as the local ID of the target communication terminal ((1) to (3) in FIG. 16).

On the other hand, the relay unit A1 receives the local ID and the Bluetooth address of its target communication terminal (the scanner unit B1) from the host computer P ((4) in FIG. 16). After that, the user sets the scanner unit B1 in the receiving-only mode by manipulating the switch 118 of the scanner unit 11 ((5) in FIG. 16). Thus, the scanner unit B1 enters the state to await the search signal without transmitting the search signal.

Assume that the scanner unit B1 has developed a problem and the content of the local ID stored in the memory device 110 has changed ((6) in FIG. 16). Here, it is assumed that the local ID stored in the memory device 10 has changed from "DEN1222222" to "DEN1012222".

Upon receiving the search signal from the relay unit A, the control device 111 of the scanner unit B1 reads the local ID and the Bluetooth address from the memory device 110 and transmits them as a response signal. The relay unit A1 receives this response signal and performs validation on the local ID included in this response signal through comparison with the local ID "DEN1222222" or the auxiliary ID "WC" stored in the memory device 130. The relay unit A1 determines the local ID included in this response signal to be invalid ("NG" in (8) in FIG. 16), because the local ID of the scanner unit B1 has been changed, and accordingly transmits the search signal again.

The user of the scanner unit B1 can know that the scanner unit B1 or the relay unit A1 is in a fault condition, because the indicator 19 of the scanner unit B1 does not indicate success of communication establishment. In this case, the user can set the scanner unit B1 in the auxiliary mode by manipulating the trigger switch 118 (for example, by pulling the trigger switch 118 for a longer time, or pulling the trigger switch 118 while pushing another switch).

When the scanner unit B1 is set in the auxiliary mode, the control circuit 111 of the scanner unit B1 uses the auxiliary local ID instead of the regular local ID ((10) in FIG. 16). More specifically, upon receiving the search signal transmitted from the relay unit A1, the control circuit 111 of the scanner unit B1 reads the auxiliary local ID "WC" and the Bluetooth address from the memory device 110, and transmits them to the relay unit A1 as the response signal ((11) in FIG. 16).

The control circuit 131 of the relay unit A1 transmits the communication establishment request signal to the scanner unit B1 upon receiving the response signal transmitted from the scanner unit B1 ((12) in FIG. 16), because this response signal includes the auxiliary local ID "WC", and the memory device 130 contains the same auxiliary local ID "WC" in addition to the regular local ID "DEN1222222". The scanner unit B1 makes a response to this communication establishment request signal, thereby communication between the scanner unit B1 and the relay unit A1 is started.

As explained above, in the radio communication system according to the third embodiment, the common auxiliary local ID "WC" is registered in the relay units A1 to A3, and the scanner units B1 to B6. And when the scanner unit B1 receives the search signal from the relay unit A1 while it is set in the auxiliary mode, it returns the auxiliary local ID "WC" combined with its Bluetooth address to the relay unit A1. With this configuration, it becomes possible to establish communication between the scanner unit B1 and the relay unit A1 even if the local ID registered in the memory device 110 of the relay unit A1 has changed without reconfigurating the relay unit A1.

Furthermore, while the scanner units B are set in the receiving-only mode, they transmit their regular local IDs (or the auxiliary local ID) and their Bluetooth addresses contained in their memory devices 110 only when they receive the search signal from outside. Accordingly, electric power drawn from the rechargeable batteries 124 of the scanner units B can be reduced, because the scanner units B do not transmit the search signal unnecessarily.

Fourth Embodiment

Figure 17:
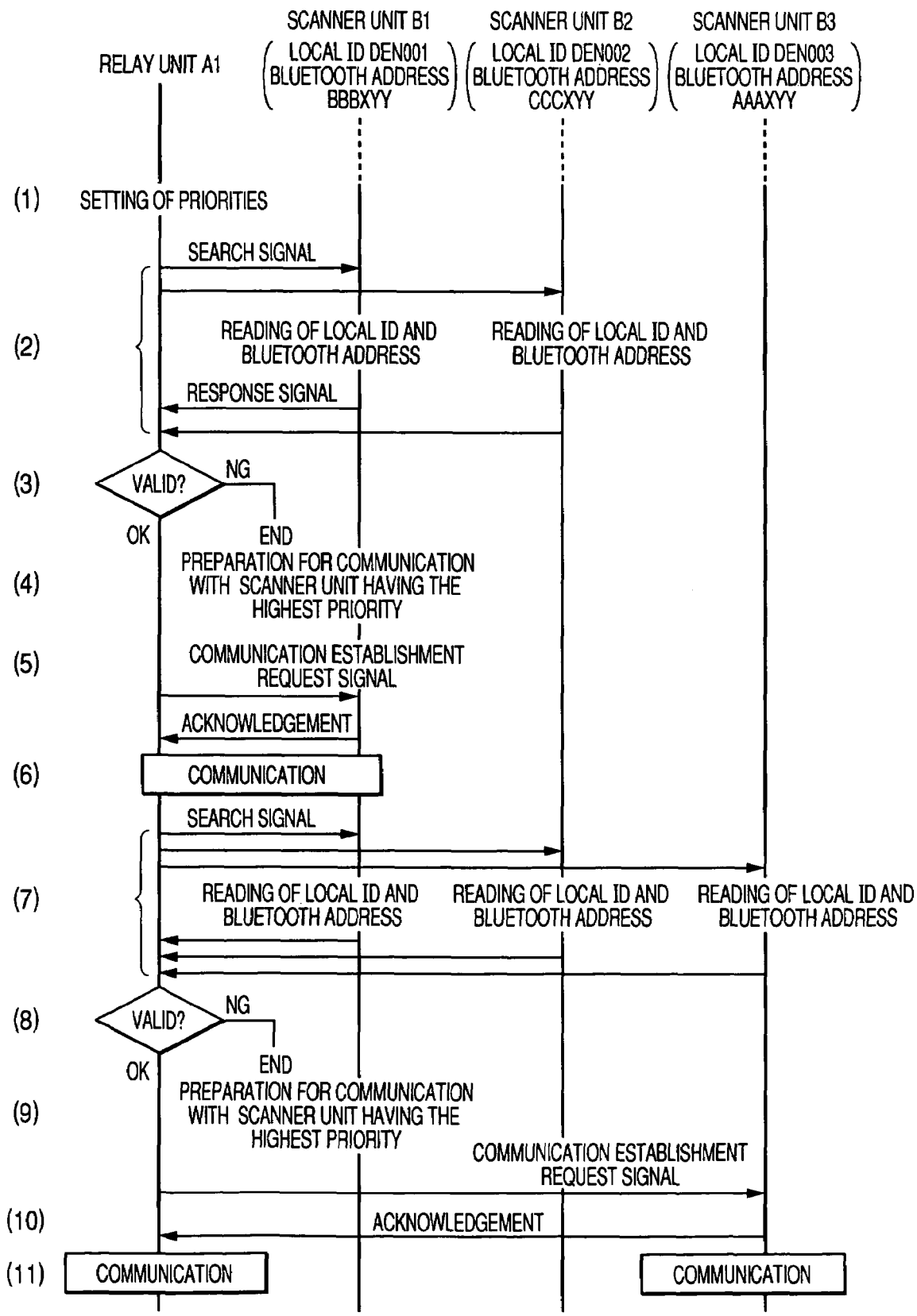
FIG. 17 is a sequence diagram showing communication status of a radio communication system according to a fourth embodiment of the invention.

FIG. 17 is a sequence diagram explaining an operation of a radio communication system according to a fourth embodiment of the invention. The fourth embodiment is different from the second embodiment in that, in the fourth embodiment, each of the relay units A selects, from among the scanner units B, a communication target depending on their priorities.

In the fourth embodiment, each time any of the scanner units B1 to B3 is registered in the relay unit A1, the control circuit 131 of the relay unit A1 sets an order of priority of the newly registered relay unit in the memory device 130 ((1) in FIG. 17). Here, it is assumed that the local ID and the Bluetooth address of the scanner unit B1 are "DEN001" and "BBBXYY", those of the scanner unit B2 are "DEN002" and "CCCXYY", and those of the scanner unit B3 are "DEN003" and "AAAXYY". The memory device 130 of the relay unit A1 contains a priority order table. When any of the relay units B1 to B3 is registered in the relay unit A1, the control circuit 130 of the relay unit A1 writes its local ID or Bluetooth address in the priority order table.

FIG. 18 shows an example of the priority order table contained in the memory device 130. As shown in this figure, for registering the scanner unit B1, B2, or B3 while setting its priority, the control circuit 130 writes either its Bluetooth address or local ID in the priority order table.

The following is an explanation about a case where the scanner units B1 and B2 transmit their local IDs and Bluetooth addresses in response to the search signal transmitted form the relay unit A1 ((2) in FIG. 17), after the scanner units B1 to B3 are registered in there lay unit A1. There lay unit A1 performs validation on the received local IDs ((3) in FIG. 17), makes preparations for communication with the scanner unit whose local has been determined to be valid and to have the highest priority ((4) in FIG. 17), starts communication with this scanner unit ((6) in FIG. 17) after completion of the communication establishment and affirmative acknowledgment ((5) in FIG. 17).

If the contents of the priority order table contained in the memory device 130 is as shown in FIG. 18, the control circuit 131 of the relay unit A1 operates to transmit the communication establishment request signal to the scanner unit B1, because the priority order of the Bluetooth address "BBBXYY" of the scanner unit B1 is higher than the local ID "DEN002" of the scanner unit B2. Thereafter, when the relay unit A1 transmits the search signal again, the scanner units B1 to B3 return response signals to the relay unit A1 ((7) in FIG. 17), the relay unit A1 performs validation on the received local IDs included in these response signals ((8) in FIG. 17). If all of the received local IDs are determined to be invalid ("NG" in (8) in FIG. 17), then this sequence ends. If the scanner unit B3 having the highest priority is newly detected, then the relay unit A1 discontinues the communication with the relay unit B1, and makes preparation for communication with the relay unit B3 ((9) in FIG. 17). That is, the relay unit A1 transmits the communication establishment request signal to the scanner unit B3 and receives the affirmative acknowledgement signal that the scanner unit B3 returns ((10) in FIG. 17). After that, the communication between the relay unit A1 and the scanner unit B3 starts ((11) in FIG. 17).

The fourth embodiment provides, in addition to the advantage of the second embodiment, the advantage that each scanner unit can communicate always with the relay unit having the highest priority without requiring the user to make any settings.

Fifth Embodiment

FIGS. 19A, 19B are diagrams for explaining the operation of a radio communication system according to a fifth embodiment of the invention. The fifth embodiment is characterized in that the relay unit A is provided with a capability for performing character code conversion on the character codes transmitted between the relay unit A and the scanner unit B and the character codes transmitted between the relay unit A and the host computer P. The memory device 130 of the relay unit A contains a code-conversion table for performing this character code conversion.

For example, in a case where the ASCII code is used for data transmission between the relay unit A and the scanner unit B and between the relay unit A and the host computer P, the control circuit 131 of the relay unit A converts the character code "CR" (&H13) received from the scanner unit B into the character code "ETX" (&H03), and converts the character cod "ETX" received from the host computer P into the character code "CR" as shown in FIG. 19A.

For another example, in a case where the ASCII code is used for data transmission between the relay unit A and the scanner unit B, and a key input code is used for data transmission between the relay unit A and the host computer P, the character code "CR" received from the relay unit B is converted into the character code "ENTER" as shown in FIG. 19B.

With the fifth embodiment, it becomes unnecessary to provide the host computer P and the scanner unit B with such a character code converting function.

Although the above described second to fifth embodiments are directed to a radio communication system in which information codes are read by use of portable scanner units, the present invention can be applied to a radio communication system for reading RFID (Radio Frequency Identification) tags. In this case, the relay unit A includes an RFID tag for storing local IDs or absolute IDs such as Bluetooth addresses, and the data stored in this RFID tag is read from outside.

The present invention is also applicable to a radio communication system not including devices for optically reading information codes (scanner units).

The above explained preferred embodiments are exemplary of the invention of the present application which is described solely by the claims appended below. It should be understood that modifications of the preferred embodiments may be made as would occur to one of skill in the art.

What is claimed is:

1. A portable-terminal holder for holding a portable terminal having a rechargeable battery and a first radio communication device comprising:
a base having a portion on which said portable terminal is placed, and a charging device for charging said rechargeable battery while said portable terminal is placed on said portion; and
a communication module having a second radio communication device communicating with said first radio communication device for wireless data transmission between said portable terminal and said communication module, and a cable communication device communicating with an external host computer for cable data transmission between said host computer and said communication module, said communication module being configured to be detachable from said base,
wherein said communication module includes a communication status indicator indicating at least one of a status of wireless data transmission by said first and second radio communication devices and a status of cable data transmission by said cable communication device, and
wherein said base has a window portion that makes said communication status indicator of said communication module attached in said base visible from outside.

2. A portable-terminal holder according to claim 1, wherein each of said base and said communication module has a power supply circuit said base and said communication module are electrically isolated from each other, and said base and said communication module are configured to be operable when detached from each other.

3. A portable-terminal holder according to claim 1, wherein said window portion is covered with a protective transparent plate 4. A portable-terminal holder according to claim 1, wherein said base includes a power status indicator indicating at least a status of charging said rechargeable battery of said portable terminal by said charging device of said base, said power status indicator being installed in such a position that said power status indicator is adjacent to said communication status indicator of said communication module attached in said base.

5. A portable-terminal holder according to claim 1, wherein said portable-terminal is a portable device for optically reading information codes.

6. A portable-terminal bolder for holding a portable terminal having a rechargeable battery and a first radio communication device comprising:
   a base having a portion on which said portable terminal is placed, and a charging device for charging said rechargeable battery while said portable terminal is placed on said portion; and
   a communication module having a second radio communication device communicating with said first radio communication device for wireless data transmission between said portable terminal and said communication module, and a cable communication device communicating with an external host computer for cable data transmission between said host computer and said communication module, said communication module being configured to be detachable from said base,
   wherein said communication module includes a plurality of connectors connected to said cable communication device for use of performing cable data transmission with outside and receiving an electric current as electric power of said communication module from outside, and a current back-flow preventing device preventing an electrical current flowing from one of said plurality of said connectors into said communication module from flowing back to the other of said plurality of said connectors.

7. A portable-terminal holder according to claim 6, wherein each of said base and said communication module has a power supply circuit, said base and said communication module are electrically isolated from each other, and said base and said communication module are configured to be operable when detached from each other.

8. A portable-terminal, holder according to claim 6, wherein said communication module includes a communication status indicator indicating at least one of a status of wireless data transmission by said first and second radio communication devices and a status of cable data transmission by said cable communication device.

9. A portable-terminal holder according to claim 8, wherein said base has a window portion that makes said communication status indicator of said communication module attached in said base visible from outside.

10. A portable-terminal holder according to claim 9, wherein said window portion is covered with a protective transparent plate.

11. A portable-terminal holder according to claim 9, wherein said base includes a power status indicator indicating at least a status of charging said rechargeable battery of said portable terminal by said charging device of said base, said power status indicator being installed in such a position that said power status indicator is adjacent to said communication status indicator of said communication module attached in said base.

12. A portable-terminal holder according to claim 6, wherein said portable-terminal is a portable device for optically reading information codes.

* * * * *